US011226769B2

(12) United States Patent
Takaoka et al.

(10) Patent No.: US 11,226,769 B2
(45) Date of Patent: Jan. 18, 2022

(54) LARGE-SCALE STORAGE SYSTEM AND DATA PLACEMENT METHOD IN LARGE-SCALE STORAGE SYSTEM

(71) Applicant: Hitachi, Ltd., Tokyo (JP)

(72) Inventors: Nobumitsu Takaoka, Tokyo (JP); Tomohiro Yoshihara, Tokyo (JP); Naoya Okada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 171 days.

(21) Appl. No.: 16/552,838

(22) Filed: Aug. 27, 2019

(65) Prior Publication Data

US 2020/0159454 A1 May 21, 2020

(30) Foreign Application Priority Data

Nov. 15, 2018 (JP) .............................. JP2018-214248

(51) Int. Cl.
*G06F 3/06* (2006.01)
(52) U.S. Cl.
CPC ............ *G06F 3/0659* (2013.01); *G06F 3/061* (2013.01); *G06F 3/065* (2013.01); *G06F 3/0631* (2013.01);
(Continued)
(58) Field of Classification Search
CPC ...... G06F 3/0659; G06F 3/061; G06F 3/0683; G06F 3/0635; G06F 3/065; G06F 3/0631;
(Continued)

(56) References Cited

U.S. PATENT DOCUMENTS 5,732,265 A * 3/1998 Dewitt .................. G06F 3/0652
7,822,939 B1 * 10/2010 Veprinsky ............. G06F 3/0641
711/170
(Continued)

FOREIGN PATENT DOCUMENTS

WO 2017/109822 A1 6/2017

OTHER PUBLICATIONS

Srinivasan, Kiran, et al. "iDedup: latency-aware, inline data deduplication for primary storage." Fast. vol. 12. 2012. (Year: 2012).*
(Continued)

*Primary Examiner* — Francisco A Grullon
(74) *Attorney, Agent, or Firm* — Procopio, Cory, Hargreaves & Savitch LLP

(57) ABSTRACT

In a large-scale storage system configured by combining a plurality of storage modules, it is possible to improve a read performance for deduplicated data. A large-scale storage system includes a first storage module and a second storage module each connected to a computing machine, the first storage module and the second storage module being connected to each other by a network, the first controller determines whether second data that is same as first data requested to be written is already stored in the second storage module when the first storage module receives a write request from the computing machine, and the first controller determines whether to store the first data in the first storage medium or to refer to the second data in the second storage module in a case in which the second data is already stored in the second storage module.

6 Claims, 19 Drawing Sheets

(52) U.S. Cl.
CPC .......... *G06F 3/0635* (2013.01); *G06F 3/0641* (2013.01); *G06F 3/0683* (2013.01)

(58) Field of Classification Search
CPC .... G06F 3/0641; G06F 3/0638; G06F 3/0689; G06F 3/0608
See application file for complete search history.

(56) References Cited

U.S. PATENT DOCUMENTS

| | | | | |
|---|---|---|---|---|
| 2008/0263244 A1* | 10/2008 | Mizuno | ................ | G06F 3/0608 710/68 |
| 2009/0271402 A1* | 10/2009 | Srinivasan | ............ | G06F 16/174 |
| 2012/0226936 A1* | 9/2012 | Prabhakaran | ........... | G06F 3/067 714/6.23 |
| 2014/0195488 A1* | 7/2014 | Patil | ................... | G06F 16/1752 707/634 |
| 2015/0106345 A1* | 4/2015 | Trimble | .............. | G06F 16/1748 707/692 |
| 2019/0087115 A1* | 3/2019 | Li | ........................ | G06F 16/137 |

OTHER PUBLICATIONS

Cox, Landon P., Christopher D. Murray, and Brian D. Noble. "Pastiche: Making backup cheap and easy." ACM SIGOPS Operating Systems Review 36.SI (2002): 285-298. (Year: 2002).*

* cited by examiner

FIG.6

__217: VOLUME MANAGEMENT TBL__

2171　2172　2173　2174　2175　2176

| VOLUME | CTL | LOGICAL CAPACITY | PORT | TYPE | LUN |
|---|---|---|---|---|---|
| 27a | 21a | 100 GiB | 23a | DATA | 0 |
| 27b | 21b | 100 GiB | 23b | DATA | 1 |
| 27c | 21c | 100 GiB | 23c | DATA | 2 |
| 27d | 21d | 100 GiB | 23d | DATA | 3 |
| 27e | 21b | 1 TiB | | DUPLICATED DATA | |
| 27f | 21d | 1 TiB | | DUPLICATED DATA | |

FIG.7

218: REFERENCE MANAGEMENT TBL

218a

| 2181 | 2182 | 2183 | 2184 | 2185 | 2186 | 2187 |
|---|---|---|---|---|---|---|
| VOLUME | DATA UNIT CACHE SPACE | DATA UNIT ADDRESS | DUPLICATED | COMPRESSED DATA CACHE SPACE OR CACHE SPACE | STORAGE DESTINATION ADDRESS | SIZE AFTER COMPRESSION |
| 27a | 270a | 2701 | N | 271a | 2501 | 4000 |
| 27a | 270a | 2702 | Y | 270e | 2708 | 5000 |

218b

| VOLUME | DATA UNIT CACHE SPACE | DATA UNIT ADDRESS | DUPLICATED | COMPRESSED DATA CACHE SPACE OR CACHE SPACE | STORAGE DESTINATION ADDRESS | SIZE AFTER COMPRESSION |
|---|---|---|---|---|---|---|
| 27b | 270b | 2703 | Y | 270e | 2708 | 5000 |
| 27e | 270e | 2704 | N | 271e | 2502 | 5000 |

218c

| VOLUME | DATA UNIT CACHE SPACE | DATA UNIT ADDRESS | DUPLICATED | COMPRESSED DATA CACHE SPACE OR CACHE SPACE | STORAGE DESTINATION ADDRESS | SIZE AFTER COMPRESSION |
|---|---|---|---|---|---|---|
| 27c | 270c | 2705 | Y | 270f | 2709 | 6000 |
| 27f | 270f | 2709 | N | 271f | 2503 | 6000 |

218d

| VOLUME | DATA UNIT CACHE SPACE | DATA UNIT ADDRESS | DUPLICATED | COMPRESSED DATA CACHE SPACE OR CACHE SPACE | STORAGE DESTINATION ADDRESS | SIZE AFTER COMPRESSION |
|---|---|---|---|---|---|---|
| 27d | 270d | 2707 | Y | 270f | 2709 | 6000 |
| 27d | 270d | 2706 | N | 271d | 2705 | 5000 |

FIG.8

219: REVERSE REFERENCE MANAGEMENT TBL

219a

| VOLUME (2191) | COMPRESSED DATA CACHE SPACE (2192) | COMPRESSED DATA ADDRESS (2193) | DATA UNIT CACHE SPACE (2194) | DATA UNIT ADDRESS (2195) | SIZE (2196) |
|---|---|---|---|---|---|
| 27a | 271a | 2501 | 270a | 2701 | 4000 |

219b

| VOLUME | COMPRESSED DATA CACHE SPACE | COMPRESSED DATA ADDRESS | DATA UNIT CACHE SPACE | DATA UNIT ADDRESS | SIZE |
|---|---|---|---|---|---|
| 27e | 271e | 2502 | 270e | 2708 | 5000 |

219c

| VOLUME | COMPRESSED DATA CACHE SPACE | COMPRESSED DATA ADDRESS | DATA UNIT CACHE SPACE | DATA UNIT ADDRESS | SIZE |
|---|---|---|---|---|---|
| 27f | 271f | 2503 | 270f | 2709 | 6000 |

219d

| VOLUME | COMPRESSED DATA CACHE SPACE | COMPRESSED DATA ADDRESS | DATA UNIT CACHE SPACE | DATA UNIT ADDRESS | SIZE |
|---|---|---|---|---|---|
| 27d | 271d | 2505 | 270d | 2706 | 5000 |

FIG.9

220: DUPLICATION MANAGEMENT TBL

220c:

| VOLUME | DUPLICATED DATA UNIT CACHE SPACE | DUPLICATED DATA UNIT ADDRESS | DATA UNIT CACHE SPACE | DATA UNIT ADDRESS |
|---|---|---|---|---|
| 2201 | 2202 | 2203 | 2204 | 2205 |
| 27e | 270e | 2708 | 270a | 2702 |
| 27e | 270e | 2708 | 270b | 2703 |

220d:

| VOLUME | DUPLICATED DATA UNIT CACHE SPACE | DUPLICATED DATA UNIT ADDRESS | DATA UNIT CACHE SPACE | DATA UNIT ADDRESS |
|---|---|---|---|---|
| 27f | 270f | 2709 | 270c | 2705 |
| 27f | 270f | 2709 | 270d | 2707 |

FIG.10

221: FINGERPRINT TBL

| FP | DATA UNIT CACHE SPACE | DATA UNIT ADDRESS |
|---|---|---|
| 0xAAAA AAAA AAAA AAAA | 270e | 2708 |
|  | 270d | 2706 |
| 0xBBBB BBBB BBBB BBBB | 270f | 2709 |
| 0xCCCC CCCC CCCC CCCC | 270a | 2701 |
|  |  |  |

| COMPRESSED DATA CACHE SPACE (2221) | COMPRESSED DATA CACHE SPACE ADDRESS (2222) | REDUNDANT GROUP (2223) | REDUNDANT GROUP PAGE ADDRESS (2224) |
|---|---|---|---|
| 271a | 272a | 25a | 251a |
| 271e | 272e | 25b | 251e |
| 271f | 272f | 25b | 251f |
| | | | |

222: PAGE MANAGEMENT TBL

FIG.12

223: CONFIGURATION MANAGEMENT TBL

| MODULE (2231) | CONTROLLER (2232) | REDUNDANT GROUP (2233) |
|---|---|---|
| 2a | 21a, 21b | 25a |
| 2b | 21c, 21d | 25b |
|  |  |  |

212: WRITE LOGIC

COMPRESSION AND STORAGE

FIG.14A
215: DEDUPLICATION LOGIC
FIG.14B
STORAGE OF DUPLICATED DATA
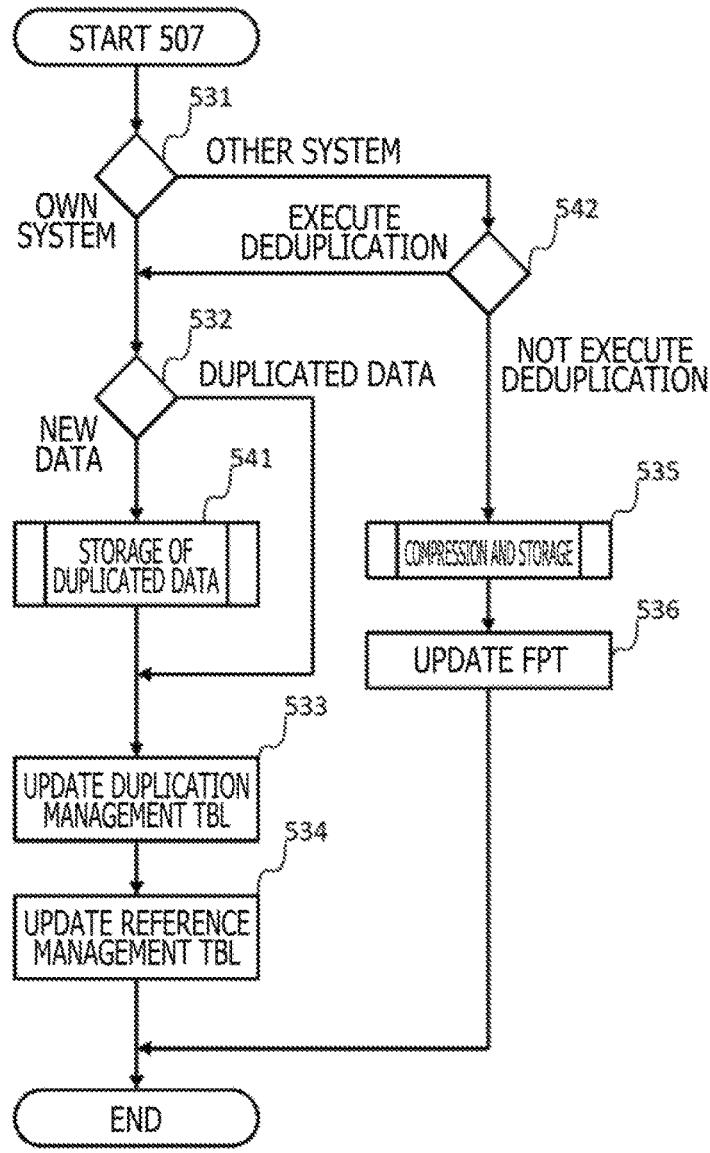
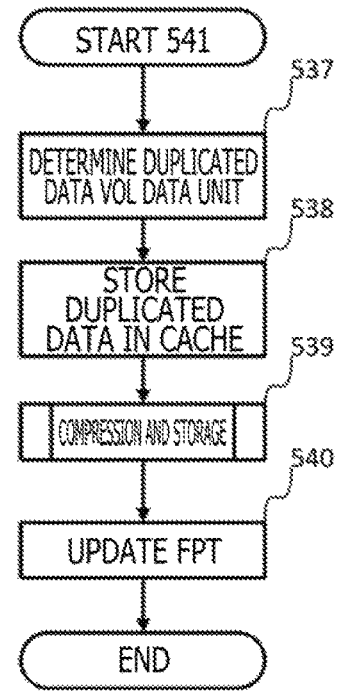

211: READ LOGIC

LARGE-SCALE STORAGE SYSTEM AND DATA PLACEMENT METHOD IN LARGE-SCALE STORAGE SYSTEM

BACKGROUND OF THE INVENTION

1. Field of the Invention

The present invention relates to data management in a storage system formed by combining a plurality of independent storage modules.

2. Description of the Related Art

There is widely adopted a method of managing data with less consumption of storage mediums in a storage system that has a data compression function and a deduplication function.

PCT Patent Publication No. WO2017/109822 discloses a method of sharing loads among controllers by changing over a reference relationship or master-subordinate relationship of deduplication in a storage system formed from a plurality of controllers.

The method described in PCT Patent Publication No. WO2017/109822 can achieve improvement in performance by sharing loads among the controllers in the storage system formed from one casing that contains a plurality of controllers. However, the method is on the premise that each controller can access all storage mediums within the storage system.

PCT Patent Publication No. WO2017/109822 makes no reference to sharing process loads in a case of applying a deduplication technique in a large-scale storage system configured by combining a plurality of storage systems or storage modules.

In the large-scale storage system configured by combining the plurality of storage modules, data stored in another storage module is often referred to for accessing data in a certain storage module due to deduplication. In such a case, it is necessary to read the data stored in another storage module and transfer the read data between the storage modules. This disadvantageously results in performance degradation.

An object of the present invention is, therefore, to provide a large-scale storage system or multi-node combined storage configured by combining a plurality of storage modules and a data placement method in a large-scale storage system capable of improving a read performance for deduplicated data.

SUMMARY OF THE INVENTION

To attain the object, a large-scale storage system according to the present invention is a large-scale storage system including a first storage module and a second storage module each connected to a computing machine, the first storage module and the second storage module being connected to each other by a network, in which the first storage module includes a first storage medium, and a first controller that configures a first volume from the first storage medium and that exercises control over a write process in such a manner that data is written to the first storage medium from the computing machine via the first volume and over a read process in such a manner that data stored in the first storage medium is read to the computing machine via the first volume, the second storage module includes a second storage medium, and a second controller that configures a second volume from the second storage medium and that exercises control over a write process in such a manner that data is written to the second storage medium from the computing machine via the second volume and over a read process in such a manner that data stored in the second storage medium is read to the computing machine via the second volume, and the first controller determines whether second data that is the same as first data requested to be written is already stored in the second storage module when the first storage module receives a write request to the first volume from the computing machine, and the first controller determines whether to store the first data in the first storage medium or to refer to the second data in the second storage module in a case in which the second data is already stored in the second storage module.

According to the present invention, it is possible to improve a read process performance in a storage system in which a plurality of storage devices are combined.

BRIEF DESCRIPTION OF THE DRAWINGS

FIG. 6 depicts a volume management table;

FIG. 7 depicts reference management tables;

FIG. 8 depicts reverse reference management tables;

FIG. 9 depicts duplication management tables;

FIG. 10 depicts a fingerprint table;

FIG. 11 depicts a page management table;

FIG. 12 is an explanatory diagram of a configuration management table;

FIGS. 14A and 14B are deduplication logic process flowcharts;

DESCRIPTION OF THE PREFERRED EMBODIMENT

Figure 1:
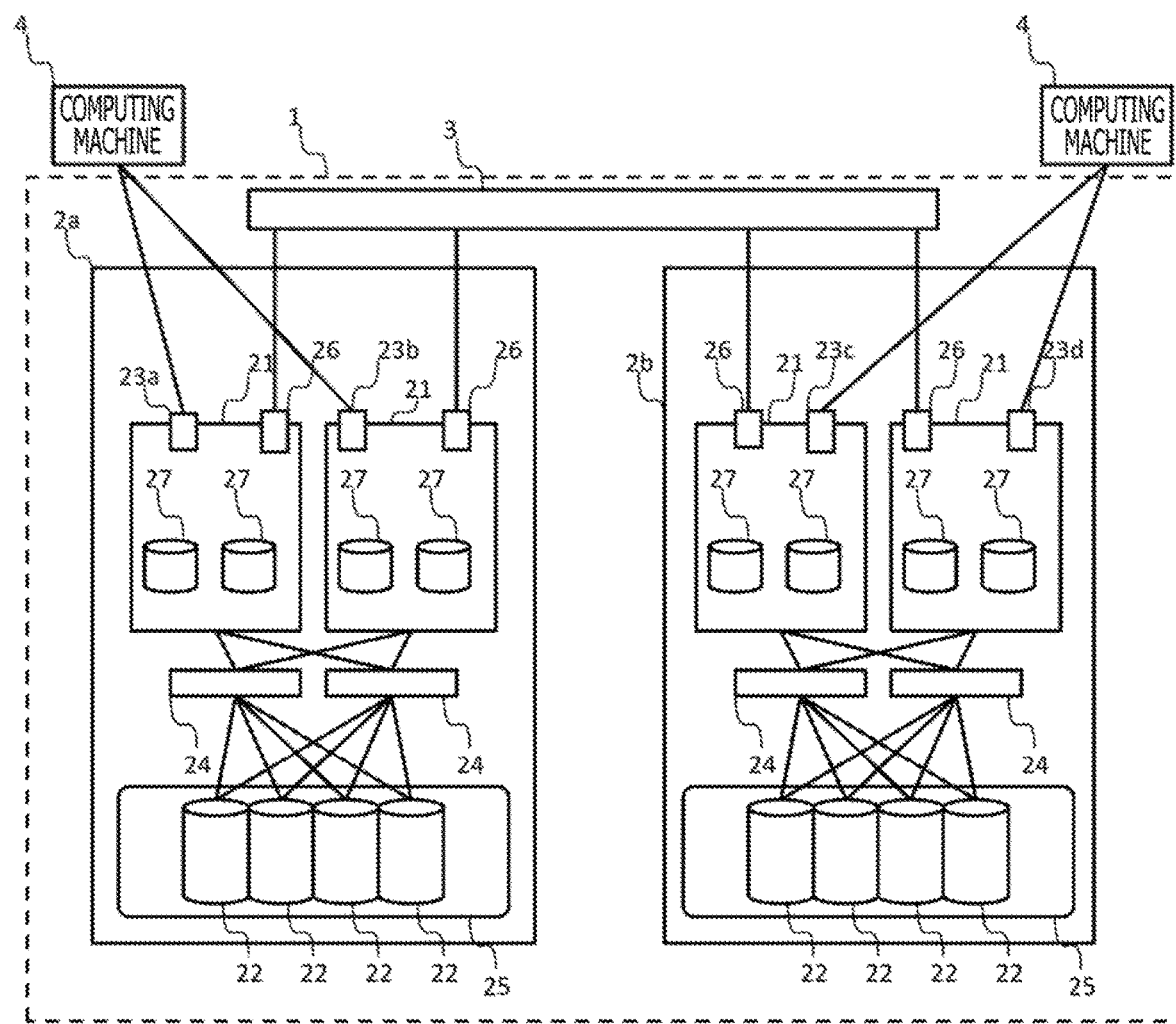
FIG. 1 is a schematic diagram of a computing machine system 100.

In the present specification, in a case in which a plurality of constituent elements have the same or similar function, the constituent elements are often described while the same reference character with an additional character denotes each constituent element. It is noted, however, in a case of no need to distinguish these constituent elements, the constituent elements are often described with the additional characters omitted.

Furthermore, while a process performed by executing a program is often described hereinafter, the program performs a specified process using storage resources such as a storage device and/or using an interface device such as a communication port as appropriate, by being executed by a processor such as a central processing unit (CPU) or a graphics processing unit (GPU); thus, a subject of the process may be the processor. Likewise, the subject of the process performed by executing the program may be a controller, an apparatus, a system, a computing machine, or a node having a processor. The subject of the process performed by executing the program may be a control section, and the control section may include a dedicated circuit such as an field-programmable gate array (FPGA) or an application specific integrated circuit (ASIC) performing a specific process.

The program may be installed into an apparatus such as a computing machine from a program source. The program source may be, for example, a program distribution server or a computing-machine-readable storage media. In a case in which the program source is the program distribution server, then the program distribution server includes a processor and storage resources storing a program to be distributed, and the processor of the program distribution server may distribute the program to be distributed to other computing machines. Moreover, in the following description, two or more programs may be realized as one program or one program may be realized as two or more programs.

While various information is often described using any of expressions such as "table," "list," and "queue" hereinafter, the information may be expressed in a data structure other than these expressions. To indicate that information does not depend on the data structure, "XX table," "XX list," or the like is often rephrased as "XX information." While expressions such as "identification information," "identifier," "name," "ID," "number," and "Region" are often used at a time of describing the identification information, these expressions can be replaceable.

<System Outline>

FIG. 1 depicts an outline of a computing machine system 100. The computing machine system 100 has a large-scale storage system 1 or multi-node combined storage, hereinafter, simply referred to as "storage system 1," and a computing machine 4 communicably connected to the storage system 1.

The storage system 1 is formed from two or more storage modules 2. Each storage module 2 can singly configure one storage system. FIG. 1 depicts a case in which the storage system 1 is formed from two storage modules 2a and 2b byway of example. Each storage module 2 has a plurality of controllers 21. The number of storage modules 2 and that of controllers 21 in each storage module 2 may be three or more.

In addition, each storage module 2 has a plurality of storage mediums 22. The storage medium includes a non-volatile memory such as a hard disk drive, a flash memory such as a Solid State Disk, a phase memory, and an optical drive. Each controller 21 accesses the storage mediums 22 via back ends 24. Since each storage module 2 singly configures a small-scale storage system, the back ends 24 configure a closed network in one storage module.

Each controller 21 manages the plurality of storage mediums 22 as a redundant group 25 to which a data protection technique such as redundant array of independent disks (RAID) is applied. This enables the controller 21 to reconstruct data in a faulty storage medium even if part of the storage mediums fails. In addition, each controller 21 has a plurality of host ports 23. Each computing machine 4 is connected to the host ports 23 and can issue a request of a data input/output process to each controller 21. Furthermore, each controller 21 configures a plurality of logical volumes 27. Each volume 27 is used as a virtual storage medium to and from which the computing machine 4 can read and write data.

In a case in which the computing machine 4 issues a request to write data to one volume 27 to one controller 21, the controller 21 records the data in the storage medium 22 configuring the redundant group 25. In this course, the controller 21 executes data compression and deduplication.

Furthermore, in a case in which the computing machine 4 issues a request to read data from one volume 27 to one controller 21, the controller 21 reads corresponding data from the redundant group 25, expands compressed data, and transmits the data to the computing machine 4.

Each controller 21 has a controller-to-controller connection port 26. The controllers 21 can mutually communicate with each other by a controller-to-controller network 3 connected to the controllers 21 via the controller-to-controller connection ports 26, and can even communicate with the controllers 21 in a different storage module 2. The controller-to-controller network 3 enables each controller 21 to input/output data to/from the redundant group 25 in the different storage module 2 or other-system storage module.

The input/output process of this type is referred to as "other-system input/output." In the other-system input/output, one controller 21 communicates with any of the controllers 21 in the other-system storage module 2 and issues a request to input/output data in the redundant group 25 of interest. The controller 21 in the other-system storage module to which the request is issued inputs/outputs data as requested and sends a response of a result. To input/output data to/from the redundant group 25 in the same storage module 2 is referred to as "own-system input/output" in contrast with the other-system input/output.

The other-system input/output is lower in response performance than the own-system input/output since the other-system input/output involves controller-to-controller communication via the controller-to-controller network 3. In addition, the other-system input/output becomes low in throughput performance in a case in which a load of the controller engaged with an operation of the other-system input/output is high.

According to the present invention, to suppress a reduction in the throughput performance involving the other-system input/output, a replica of data stored in the other storage module 2 is stored in the own-system storage module 2 to prevent occurrence of the other-system input/output as needed; thus, it is possible to improve the throughput performance of the entire system.

<Outline, Definition of Terms, and Outline of Large-Scale Storage System>

Figure 2:
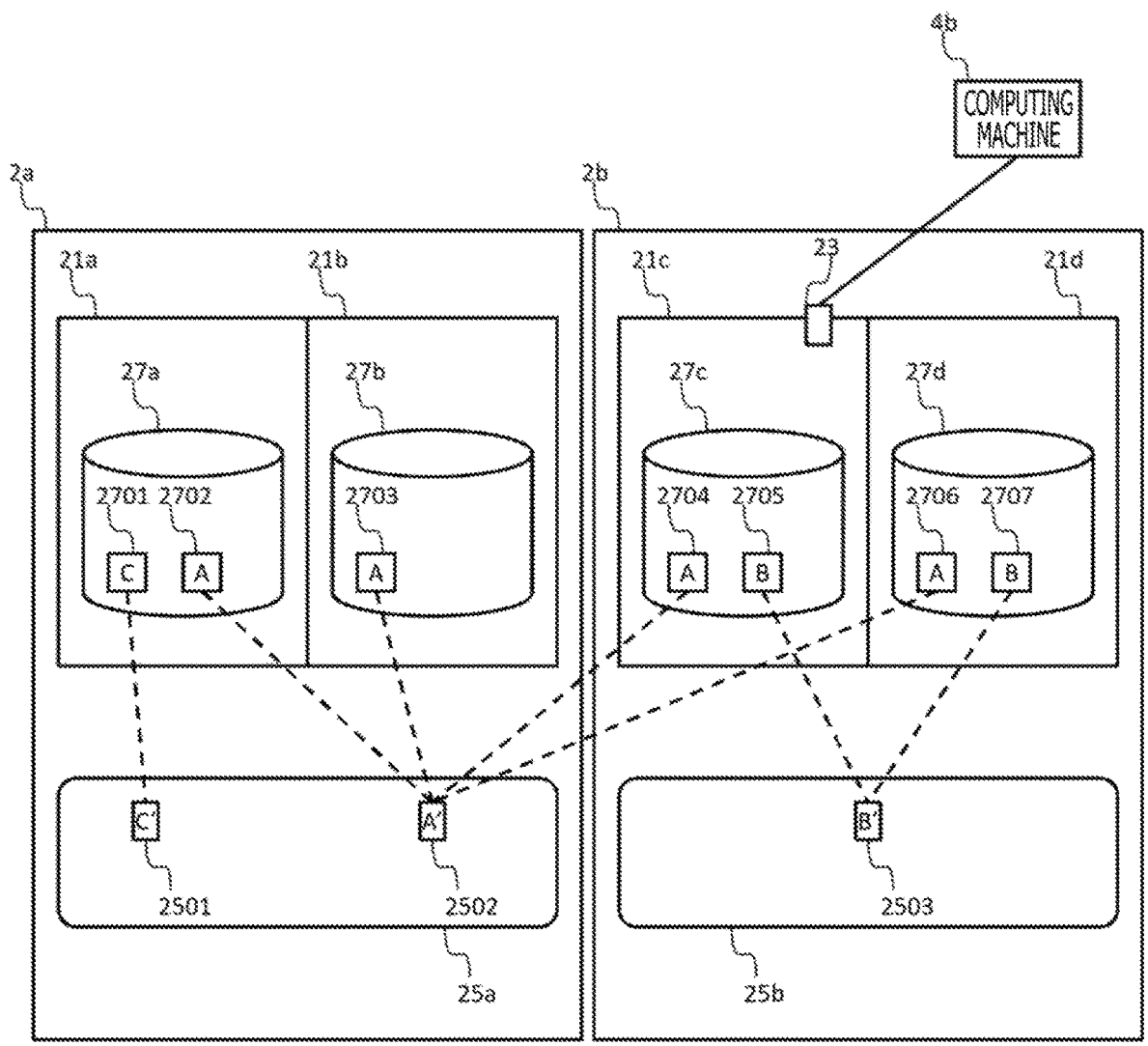
FIG. 2 is an explanatory diagram of data management between volumes 27 and redundant groups 25 in a storage system 1.

An outline of the present embodiment will be described with reference to FIGS. 2 and 3. FIG. 2 is an explanatory diagram of data management between the volumes 27 and the redundant groups 25 in the storage system 1. FIG. 2 depicts the storage modules 2a and 2b in the storage system 1 as well as a plurality of controllers 21a, 21b, 21c, and 21d and a plurality of redundant groups 25a and 25b belonging to the storage modules 2a and 2b.

The controllers 21a and 21b belong to the storage module 2a, while the controllers 21c and 21d belong to storage module 2b in the storage system 1. In addition, the redundant groups 25a and 25b belong to the storage modules 2a and 2b, respectively. The controllers 21a, 21b, 21c, and 21d exercise control over the volumes 27a, 27b, 27c, and 27d, respectively. In addition, each controller 21 also exercises control over a plurality of volumes 27 that are not depicted.

In the present specification, the volumes including the volumes 27a to 27d configured in the storage system 1 are often generically denoted by reference character 27. A logical unit number (LUN) that is a unique identification number is defined in each volume 27. In addition, logical block addresses (LBA) are assigned to 512-byte logical blocks in a recording area of each volume 27 in ascending order.

In a case of inputting/outputting data to/from a specific logical block range in the specific volume 27, the computing machine 4 designates, as input/output request parameters to the storage system 1, an LUN of the volume 27, LBAs of the logical blocks, and a length of an access range or the number of logical blocks. In the recording area of the volume 27, continuous regions demarcated by an 8-kilobyte delimitation are defined as data units.

FIG. 2 depicts data units 2701 to 2707 on the volumes 27a to 27d, respectively. The data units are often generically referred to as "data unit 2700," hereinafter.

While a size of the data unit 2700 is eight kilobytes in the present embodiment, data units of various sizes are available. In addition, the data units on the volumes 27 are often generically denoted by reference character 2700.

Each controller 21 compresses data of the data units 2700 for each data unit and stores the compressed data in the redundant group 25. The data of each data unit 2700 after compression stored in the redundant group 25 is referred to as "compressed data." In the present specification, the compressed data is often generically denoted by reference character 2500.

Each controller 21 manages a correspondence relationship between each data unit 2700 and each compressed data 2500 using a reference management table 218 that is not depicted in FIG. 2. Details of the reference management table 218 will be described later with reference to FIG. 7 and the like. A relationship that the data of each data unit 2700 is compressed and stored in the corresponding redundant group 25 as the compressed data 2500 is expressed by a broken line between the data unit 2700 and the compressed data 2500. For example, data "C" of the data unit 2701 is compressed and stored as compressed data 2501 "C'."

In the present embodiment, each controller 21 has a data deduplication function and a data unit 2700 is assumed as a unit of deduplication. In other words, a plurality of data units 2700 having the same content are associated with common compressed data 2500 due to deduplication. For example, in FIG. 2, the data units 2702, 2703, 2704, and 2706 are the data units having the same data, that is, alphabet "A" is used to express that data is the same.

The controllers 21 apply deduplication to the data units 2702, 2703, 2704, and 2706 and associate the data units 2702, 2703, 2704, and 2706 with common compressed data 2502 "A'." It is thereby possible to compress a consumption amount of the recording areas of the redundant groups 250 to one-quarter, compared with a case of associating the data units 2702, 2703, 2704, and 2706 with respective pieces of unique compressed data, respectively.

A case in which the data unit 2704 on the volume 27c configured in the controller 21c is read by the computing machine 4b will now be considered. The controller 21c needs to read the compressed data 2502 of the data unit 2704, expand the compressed data 2502, and transfer the data to the computing machine 4 that is a read request source. Since the compressed data 2502 is stored in the redundant group 25a that belongs to the storage module 2a different from the storage module 2b to which the controller 21c belongs, a process for the controller 21c to read the compressed data 2502 is the other-system input/output. Owing to this, a read process performed on the data unit 2704 is lower in performance than that performed on the data unit 2705.

Figure 3:
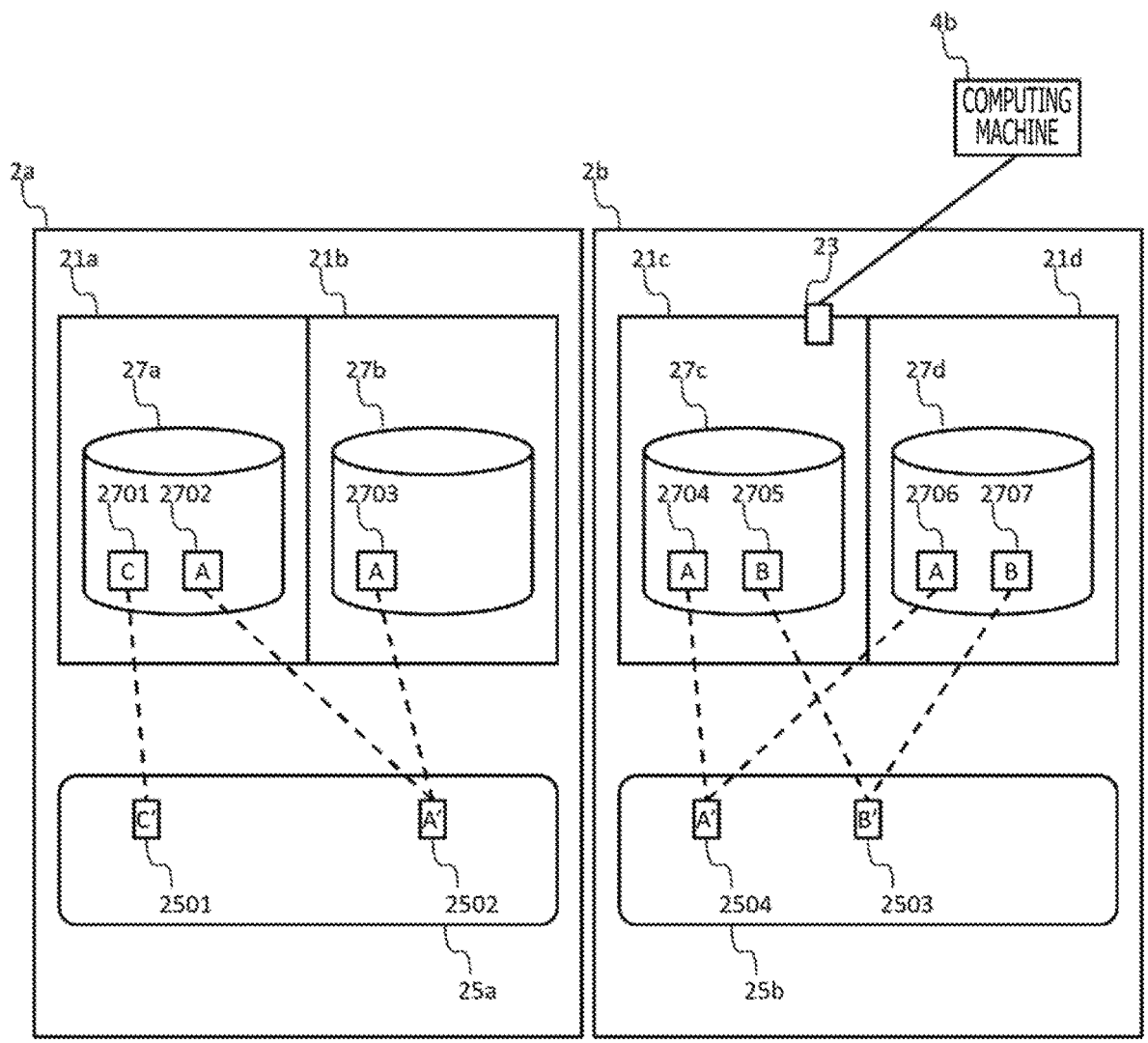
FIG. 3 is an explanatory diagram of data management between the volumes and the redundant groups.

FIG. 3 depicts data management between the volumes and the redundant groups. In FIG. 3, the data units 2702, 2703, 2704, and 2706 are data units that hold the same data. While the deduplication is applied to these data units 2702, 2703, 2704, and 2706, the common compressed data "A'" is stored in the storage modules 2a and 2b.

In this state, the other-system input/output does not take place in the read processes performed on the deduplicated data units 2704 and 2706. A basic concept of the present invention is to improve a read performance by placing data in the storage system 1 so that such other-system input/output does not take place, or occasions of the other-system input/output are reduced. As an opportunity of controlling data placement, the following opportunities are conceivable.

Opportunity 1: At Time of Data Write Process

A case in which the controller 21c executes deduplication to the data unit 2704 will be considered. It is assumed herein that a data write request is processed for the data unit 2704 and that write data is stored on a cache, not depicted, of the controller 21c.

The controller 21c recognizes herein that compressed data that is the same as data such as data unit 2704 written to a cache memory is already stored in the storage module 2a as compressed data 2502. The controller 21c stores compressed data of the data unit 2704 in the redundant group 25b of the storage module 2b so that the other-system input/output does not take place.

Next, it is assumed that the same data as the data unit 2704 is written to the data unit 2706. The controller 21d recognizes that the volume 27c of the data unit 2704 is subordinate to the same storage module 2b as that to which the volume 27d of the data unit 2706 is subordinate. The controller 21d then executes deduplication to the data units 2704 and 2706, and stores compressed data 2504 common to the data units 2704 and 2706 in the redundant group 25b. The controller 21d then associates the data units 2704 and 2706 with the compressed data 2504. A storage area of the redundant group 25b in which the compressed data 2504 of the data unit 2704 is stored before the deduplication is managed within the storage system 1 so that the storage area can be reused as an empty area. In other words, while the write process is additionally performed once and the same compressed data is described in the redundant group 25b, the compressed data 2504 corresponding to the data unit 2704 is deleted by executing the deduplication.

As an opportunity of executing the deduplication, not only a time of receiving a write request from the computing machine 4 but also a time of executing the deduplication to the data units already stored in the entire volumes 27 independently of a write request process is conceivable.

Opportunity 2: At Time of Data Read Process

The controller 21 performs data placement at an opportunity of processing a read request to the data unit 2700 from the computing machine 4.

Opportunity 3: Cyclic Process

Any one of the controllers 21 cyclically makes data movement from a state of FIG. 2 to a state of FIG. 3 and changes the correspondence relationship.

<Hardware Configuration>

Figure 4:
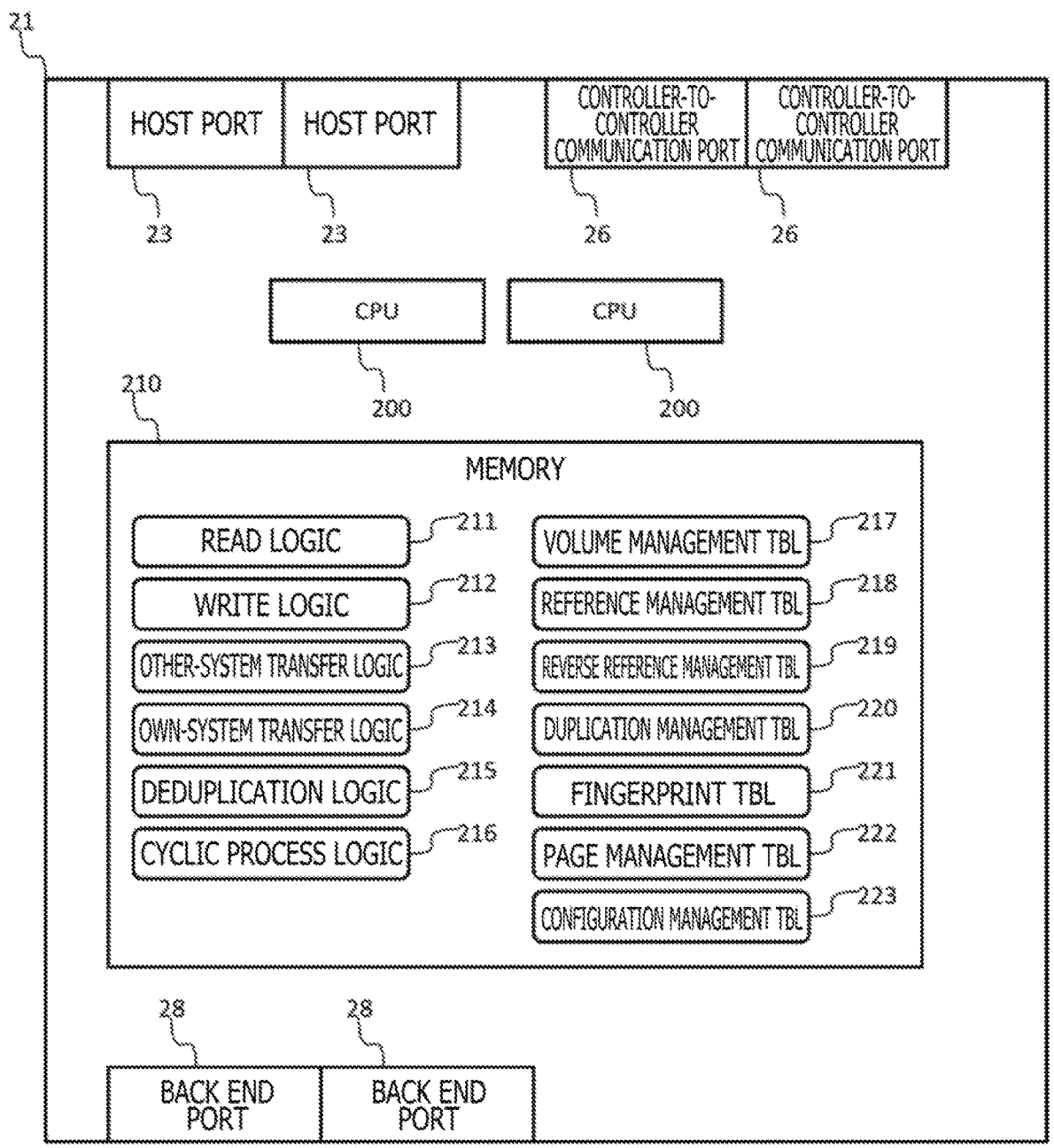
FIG. 4 is a hardware configuration diagram of a controller.

FIG. 4 depicts a hardware configuration of the controller 21. The controller 21 is a computing machine formed from constituent elements such as the host ports 23, the controllerto-controller communication ports 26, CPUs 200, a memory 210, and the back end ports 28.

The CPUs 200 each realize a function as a storage device by executing a program stored in the memory 210. A plurality of types of logic are implemented in the program. Read logic 211 is logic for processing a read request from the computing machine 4. Write logic 212 is logic for processing a write request from the computing machine 4. Other-system transfer logic 213 is logic for transferring data between the storage modules 2. Own-system transfer logic 214 is logic for reading data from the redundant group 25 configured in the storage module 2. Deduplication logic 215 is logic for performing a deduplication process. Cyclic process logic 216 is logic for cyclically executing the deduplication.

These types of logic use a plurality of tables stored in the memory 210, table being denoted as TBL in the drawings. While the embodiment is described with a form of data used by each logic assumed as a table form for understanding contents, the form is not limited to the table form as long as the data has a data structure of managing correspondence of each information.

A volume management table 217 is a table for managing volumes 27 configured in the storage system 1. Reference management tables 218 are tables for managing data units 2700 of the volumes 27 and whereabouts, or reference relationship, of data of the data units 2700. Reverse reference management tables 219 are table for managing from what data unit the data is referred to. While the reverse reference management tables 219 are used at a time of executing garbage collection or the like for the storage mediums 22, it is unnecessary to particularly describe details of the reverse reference management tables 219 in the description of operations of the present embodiment.

Duplication management tables 220 are tables for managing, in a case in which data units 2700 are deduplicated, duplicated data results from what deduplicated data units 2700. A fingerprint table 221 is a table used for identifying the same data in the deduplication process. A page management table 222 is a table for managing allocation of storage areas in the redundant groups 25. A configuration management table 223 is a table for managing configuration information about the storage system 1.

The memory 2 is also used as the cache memory by the controller 2 in the input/output process performed on the corresponding volume 27. The numbers of constituent elements such as the CPUs contained in the controller 21 depicted in FIG. 4 are not limited to those depicted therein.

<Volume Configuration>

Figure 5:
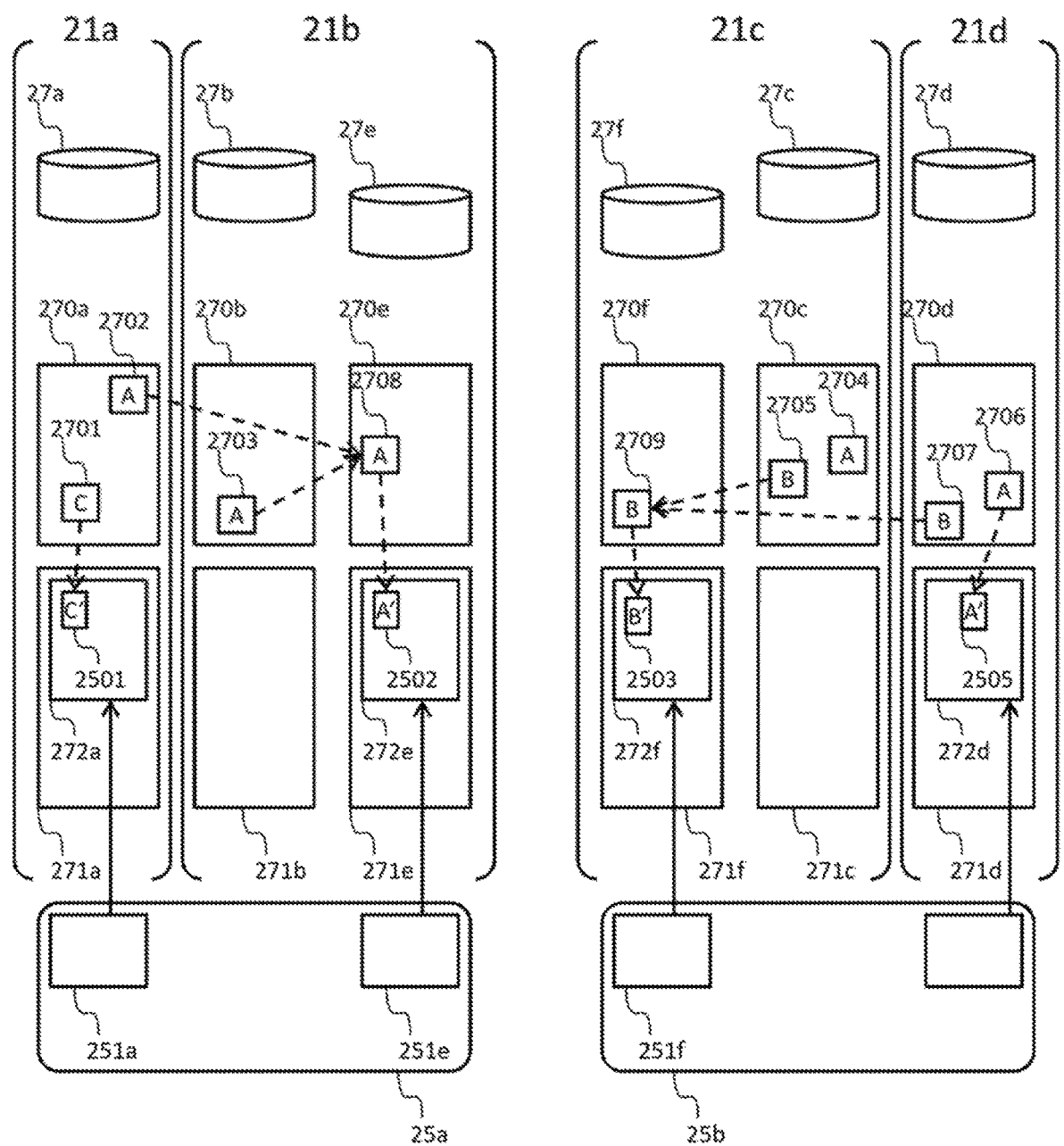
FIG. 5 is an explanatory diagram of a data management method.

FIG. 5 depicts a data management method. The storage system 1 configures volumes 27a to 27f. The volumes 27a, 27b, 27c, and 27d are volumes which are recognized by the computing machine 4 and for which the computing machine 4 issues an input/output request. The volumes 27e and 27f are volumes used by the storage system 1 for internally managing duplicated data.

The controller 21a exercises control and management over input/output of data to/from the volume 27a. Likewise, the controller 21b exercises control and management over input/output of data to/from the volumes 27b and 27e, the controller 21c exercises control and management over input/output of data to/from the volumes 27f and 27c, and the controller 21d exercises control and management over input/output of data to/from the volume 27d.

As depicted in FIG. 5, cache spaces 270 denoted by reference characters 270a to 270f and compressed data cache spaces 271 denoted by reference characters 271a to 271f are associated with the volumes 27a to 27f. The cache spaces 270 are logical address spaces.

An address in each cache space 270 uniquely corresponds to an LBA in the associated volume 27. For example, in a case in which the computing machine 4 records data at LBA2048 in the volume 27a, the data is recorded in the cache memory or part of the memory 210, and managed so that the data is identified as that at an LBA2048 in the cache space 270a.

The compressed data cache spaces 271 denoted by reference characters 271a to 271f are virtual address spaces for managing a storage position of each compressed data 2500. The storage system 1 manages the association of an address in each compressed data cache space 271 with an LBA in the corresponding volume 27 and an address in the corresponding cache space 270 by means of the reference management table 218. A minimum unit in this association is a data unit. Pieces of compressed data 2500 may be stored closely in an address order in each compression cache space 271.

A recording area of the corresponding redundant group 25 is further allocated to each compressed data cache space 271. An allocation unit of allocating the recording area of the redundant group 25 to the compressed data cache space 271 is, for example, 42 MB. A recording area obtained by demarcating the recording area of the redundant group 25 with the allocation unit is referred to as "page."

The write logic 212 records data in the compressed data cache space 271 in a page allocated to the address space including the address of the data. For example, a recording area 251a in the redundant group 25 is allocated, as a page, to an address 272a in the compressed data cache space 271.

FIG. 5 depicts that, for the data unit 2701 in the cache space 270a, compressed data of the data unit 2701 is recorded as compressed data 2501 in the compressed data cache space 271a and stored in the page 251a in the redundant group 25a. Likewise, FIG. 5 depicts that, for a data unit 2708 in the cache space 270e, compressed data of the data unit 2708 is recorded as compressed data 2502 in the compressed data cache space 271e and stored in a page 251e in the redundant group 25a.

FIG. 5 depicts that the data unit 2702 in the cache space 270a and the data unit 2703 in the cache space 270b are deduplicated data units, and that the duplicated data with the deduplicated data units is managed as the data unit 2708 in the volume 27e. In addition, the compressed data of the data unit 2708 is managed as the compressed data 2502 and stored in the page 251e similarly to the above.

The data unit 2706 is a data unit in which data of the same content as that of the data units 2702 and 270d stored in the different storage module is recorded. Owing to this, the data unit 2706 is not deduplicated together with the data units 2702 and 2703 and compressed data of the data unit 2706 is recorded and managed as compressed data 2505.

The data unit 2704 is a data unit right after data in response to a write request from the computing machine 4 that acts as a host is stored in the cache. Since data of the data unit 2704 is present only on the cache memory, the data is not associated with compressed data.

<Various Tables>

FIG. 6 is an explanatory diagram of the volume management table 217. Each row of the volume management table 217 corresponds to one volume 27 and holds information about the corresponding volume 27. Columns of the volume management table 217 will be described hereinafter.

A column 2171 is a column for recording an identifier of the volume 27 corresponding to each row. For the sake of convenience of description, the reference character denoting each volume 27 in the present specification is described as the identifier of the volume 27. An integer or the like can be used as a data type of the identifier of each volume 27. It is noted that identifiers or addresses of the constituent elements and logical constituent elements of the storage system 1 will be described hereinafter similarly using the reference characters in the present specification.

A column 2172 is a column for recording an identifier of the controller 21 that exercises control and management over input/output of data to/from the corresponding volume 27.

A column 2173 is a column for recording a logical capacity of the corresponding volume 27.

A column 2174 is a column for recording an identifier of the host port 23 to which the computing machine 4 is accessible for the corresponding volume 27.

A column 2175 is a column for recording a type of the corresponding volume 27. In the column 2175, "duplicated data" is recorded in a case in which the corresponding volume 27 is a duplicated data volume, and "data" is recorded in a case in which the corresponding volume 27 is a volume used by the computing machine 4.

A column 2176 is a column for recording the LUN set in the corresponding volume 27.

For example, it is indicated that the volume "27*a*" as in the column 2171 is controlled by the controller "21*a*" as in the column 2172 and has a logical capacity "100 GB" as in the column 2173, the corresponding port 23 is "23*a*" as in the column 2174, the volume type is "data" as in the column 2175, and the LUN is "0" as in the column 2176.

FIG. 7 is an explanatory diagram of the reference management tables 218. Each row of the reference management tables 218 holds information about the corresponding data unit 2700. Columns of a reference management table 218*a* will be described hereinafter.

A column 2181 stores the identifier of the volume 27 of the corresponding data unit 2700.

A column 2182 stores an identifier of the cache space 270 of the corresponding data unit 2700.

A column 2183 stores an address of the corresponding data unit 2700 on the cache space 270. It is noted that the reference character of the data unit 2700 is described as the address of the data unit 2700 in FIG. 7 for the sake of description. In addition, in explanatory diagrams of the subsequent various tables, addresses including the LBA are expressed by the reference characters of the corresponding data unit 2700, compressed data 2500, or the pages 251 for the sake of description.

A column 2184 stores information indicating whether the corresponding data unit 2700 is a deduplicated data unit. In a case of the deduplicated data unit, "Y" is recorded in the column 2183. Otherwise, "N" is recorded therein.

A column 2185 records an identifier of the compressed data cache space 271 in which the compressed data 2500 of the corresponding data unit 2700 is stored, or records the identifier of the cache space 270 of a duplicated data volume 27 in which the duplicated data is stored in a case in which the corresponding data unit 2700 is the deduplicated data unit.

A column 2186 records an address of the compressed data 2500 of the corresponding data unit 2700 on the compressed data cache space 271 in which the compressed data 2500 is stored. In the case in which the corresponding data unit 2700 is the deduplicated data unit, the column 2186 records an address of the data unit 2700 in the duplicated data volume 27 in which the duplicated data is stored.

A column 2187 stores a size of the compressed data 2500 of the corresponding data unit 2700.

For example, the data unit "2701" as in the column 2183 is managed to correspond to the volume "27*a*" as in the column 2181, the cache space "270*a*" as in the column 2182, "N," which is a state in which the corresponding data unit 2700 is not the deduplicated data unit, as in the column 2184, and the compressed data cache space or cache space "271*a*" as in the column 2185.

FIG. 7 indicates that not only the reference management table 218*a* is managed by the controller 21*a* but also reference management tables 218*b*, 218*c*, and 218*c* are similarly managed by the other controllers 21*b*, 21*c*, and 21*d*, respectively.

While each reference management table 218 is a table independent per volume 27 in the present embodiment, FIG. 7 expresses that each reference management table 218 is held per controller 21 for the sake of convenience of description.

FIG. 8 is an explanatory diagram of the reverse reference management tables 219. The reverse reference management tables 219 are used for executing the garbage collection or the like for the storage mediums 22. For reference, the reverse reference management tables 219 will be described. Each of the reverse reference management tables 219 corresponds to the compressed data 2500 in the compressed data cache space 271 and holds information about the corresponding compressed data 2500. Columns of a reverse reference management table 219*a* will be described hereinafter. A column 2191 stores the identifier of the volume 27 for the corresponding compressed data 2500. A column 2192 stores the identifier of the compressed data cache space 271 of the corresponding compressed data 2500. A column 2193 stores an address of the corresponding compressed data 2500 in the compressed data cache space 271. A column 2194 stores the identifier of the cache space 270 of the data unit 2700 for the corresponding compressed data 2500. A column 2195 stores an address of the data unit 2700 for the corresponding compressed data 2500. A column 2196 stores the size of the corresponding compressed data 2500.

FIG. 8 indicates that not only the reverse reference management table 219*a* is managed by the controller 21*a* but also reverse reference management tables 219*b*, 219*c*, and 219*d* are similarly managed by the other controllers 21*b*, 21*c*, and 21*d*, respectively.

As depicted in FIG. 8, each controller 21 holds the reverse reference management table 218 in respect to the volume 27 to be processed by the controller 21. While each reverse reference management table 219 is a table independent per volume 27 in the present embodiment, FIG. 8 expresses that each reverse reference management table 219 is held per controller 21 for the sake of convenience of description.

FIG. 9 is an explanatory diagram of the duplication management tables 220 managed by each of the controllers 21*b* and 21*c*.

The duplication management tables 220 are tables for managing a relationship of each data unit 2700 of duplicated data in the duplicated data volume with the data unit 2700 in the other volume 27 referring to the duplicated data.

Each row of the duplication management tables 220 corresponds to one data unit 2700 referring to the duplicated data and holds the relationship between the corresponding data unit 2700 and the duplicated data. Columns of the duplication management tables 220 will be described hereinafter.

A column 2201 stores an identifier of the duplicated data volume 27 that holds the duplicated data.

A column 2202 stores an identifier of the cache space 270 of the duplicated data volume 27 that holds the duplicated data.

A column 2203 stores an address of the data unit 2700 of duplicated data in the duplicated data volume 27 that stores the duplicated data.

A column 2204 holds an identifier of the cache space 270 of the data unit 2700 referring to the duplicated data.

A column 2205 holds an address of the data unit 2700 referring to the duplicated data.

For example, the volume "27e" as in the column 2201 is managed to correspond to the duplicated data unit cache space "270e" as in the column 2202, the duplicated data unit address "2708" as in the column 2203, the data unit cache space "270a" as in the column 2204, and the data unit address "2702" as in the column 2205. While both of the duplicated data unit cache space and the data unit cache space correspond to the cache space 270 in FIG. 5, different names are used for distinguishing the former from the latter for the sake of convenience of description. The same thing is true for the addresses, which correspond to contents of FIG. 5.

FIG. 10 is an explanatory diagram of the fingerprint table 221. A fingerprint means a fixed-length byte string uniquely calculated from a content of data. As an algorithm for calculating the fingerprint, MessageDigest 5 (MD5), Secure Hash Algorithm 1 (SHA-1), and the like are widely known. Calculating the fingerprint of data in each data unit 2700 and recording the fingerprint and the address of the data unit 2700 in pairs in the fingerprint table 220 make it possible to accelerate a search of the same data within the storage system 1.

Each row of the fingerprint table 221 corresponds to a value of the fingerprint, and associates the value of the fingerprint with the address of the data unit 2700 for which the value of the fingerprint is calculated. Columns of the fingerprint table 221 will be described hereinafter.

A column 2211 stores the value of each fingerprint.

A column 2212 stores the identifier of the cache space 270 of the data unit 2700 for which the value of the fingerprint stored in the column 2211 is calculated.

A column 2213 stores the address of the data unit 2700 for which the value of the fingerprint stored in the column 2211 is calculated.

It is noted that the fingerprint table 221 can store information about a plurality of data units 270 for one fingerprint. While the data units 2708 and 2706 are recorded for the value of the fingerprint 0xAAAA AAAA AAAA AAAA in hexadecimal number in FIG. 10, this indicates that both of the fingerprints of the data units 2708 and 2706 are 0xAAAA AAAA AAAA AAAA.

FIG. 11 is an explanatory diagram of the page management table 222. The page management table 222 is a table for managing correspondence between the address of each compressed data cache space 271 and an address of the page 251 in the redundant group 25 allocated to the address. Each row of the page management table 222 corresponds to one page and holds the correspondence between the address of the page and the address of the compressed data cache space 271 to which the page is allocated.

Columns of the page management table 222 will be described hereinafter.

A column 2221 stores the identifier of the compressed data cache space 271 to which the corresponding page 251 is allocated.

A column 2222 stores a starting address of the compressed data cache space 271 to which the corresponding page 251 is allocated.

A column 2223 stores an identifier of the redundant group 25 of the corresponding page 251.

A column 2224 stores a starting address of the corresponding page 251 in the redundant group 25.

FIG. 12 is an explanatory diagram of the configuration management table 223. In the configuration management table 223, each row corresponds to one storage module 2 configured in the storage system 1 and records configuration information about the storage system 2.

Columns of the configuration management table 223 will be described hereinafter.

A column 2231 stores an identifier of the corresponding storage module 2.

A column 2232 stores identifiers of the controllers 21 contained in the corresponding storage module 2.

A column 2233 stores the identifier of the redundant group 25 contained in the corresponding storage module 2.

<Write Process>

In the present embodiment, in a case in which the other-system input/output takes place, determination whether to read data stored in the other storage module or to store the same data in the own-system storage module 2 is made as the deduplication process. As the deduplication process, a write process by the write logic 212, a read process by the read logic 211, a cyclic process by the cyclic process logic 216, and a deduplication process by the deduplication logic 215 will be described in this order. It is noted that reference characters are often omitted hereinafter for the sake of convenience of description.

Figure 13A:
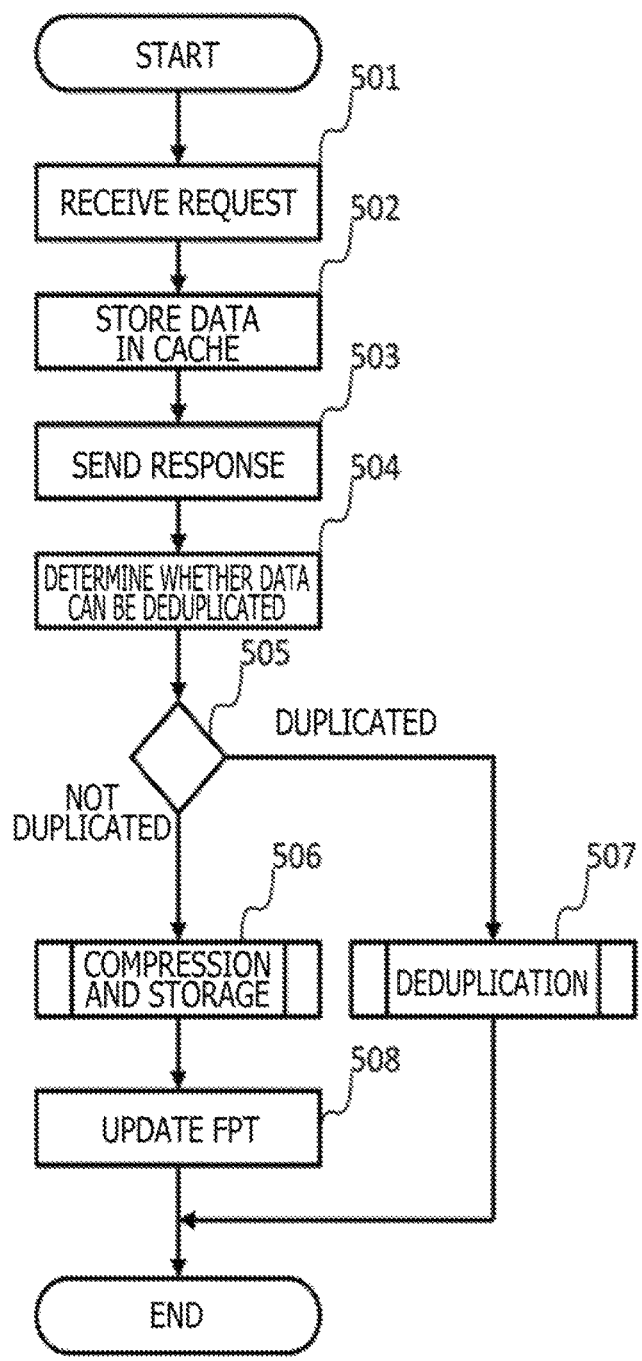
FIGS. 13A and 13B are write logic process flowcharts.
Figure 13B:
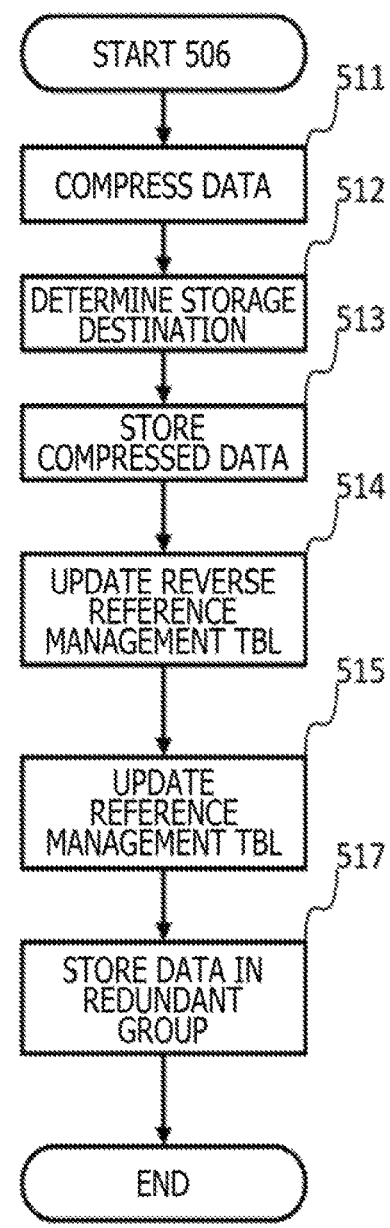

FIGS. 13A and 13B are explanatory diagrams of process flows by the write logic 212. The write logic 212 is logic that starts on an opportunity of receiving a data write request from the computing machine 4 and that stores requested data. While various types of logic including the write logic 212 are used as subjects, this is intended to intuitively describe that an effect is produced by executing any of these types of logic by the CPU 200.

Furthermore, the processes will be described while taking, by way of example, a case in which the computing machine 4 writes data of the same size, eight kilobytes in this case, as that of one data unit to one data unit, the present invention can be carried out regardless of the size of write data from the computing machine 4 and the address as described hereinafter. In a case of writing data of a size smaller than that of the data unit, data of a remaining size corresponding to that of a portion of the data unit is complemented using the read logic 211 to be described later and the write logic 212 is executed. In a case of writing data to a plurality of data units, the write logic 212 repeatedly executes the process on the plurality of requested data units.

In Step 501 of FIG. 13A, the write logic 212 receives a write request and data from the computing machine 4.

In Step 502, the write logic 212 stores the data received from the computing machine 4 in the cache memory or part of the memory 210. In addition, the write logic 212 performs a process for protecting the data stored in the cache memory. Specifically, the write logic 212 replicates data in the cache memory of the controller 21 other than the controller 21 that has received the request. An address of the cache memory is associated with the address of the cache space 270.

In Step 503, the write logic 212 sends a response of completion of a write operation to the computing machine 4 that has issued the request.

In Steps 504 and 505, the write logic 212 determines whether the requested data can be deduplicated, that is, whether the same data as the requested data is already stored in the storage system 1. In this determination, (1) the write logic 212 calculates a fingerprint of the requested data. (2) The write logic 212 searches the fingerprint table 221 and determines whether the fingerprint calculated in (1) is already registered.

In a case of determining that the data requested in Step 501 cannot be deduplicated, that is, the same data is not stored in the storage system 1 in the determination of Steps 504 and 505, the write logic 212 goes to Step 506.

In Step 506, the write logic 212 compresses the data determined to be incapable of being deduplicated and stores the data in the redundant group 25. Details of this process will be described later.

In Step 508, the write logic 212 calculates the fingerprint of the data determined to be incapable of being deduplicated and registers the fingerprint in the fingerprint table 221. The write logic 212 then ends the process.

On the other hand, in a case of determining that the data can be deduplicated in Steps 504 and 505, the write logic 212 executes Step 507. Step 507 is a process for executing deduplication on the data determined to be capable of being deduplicated. Details of this process will be described later. The write logic 212 then ends the process.

The details of the process by the write logic 212 that stores the compressed data in Step 506 will be described with reference to the process flowchart of FIG. 13B.

In Step 511, the write logic 212 compresses the data stored in the cache memory and temporarily stores the compressed data in the memory 210.

In Step 512, the write logic 212 determines an area or address and length in the compressed data cache space 271 for storing the compressed data. The write logic 212 determines the area in the compressed data cache space as a next area to a previously determined area in ascending order of address. Details of logic for securing the area in the compressed data cache space 271 are not described in the present specification.

In Step 513, the write logic 212 stores compressed data in the cache memory associated with the address of the compressed data cache space secured in the previous step.

In Step 514, the write logic 212 records the correspondence relationship between the compressed data and the data unit in the reverse reference management table 219.

In Step 515, the write logic 212 records the correspondence relationship between the data unit and the compressed data in the reference management table 218.

In Step 516, the write logic 212 stores the compressed data in the compressed data cache space in a page already allocated to the space. In a case in which the page is not allocated to the compressed data cache space yet, the write logic 212 secures a page from the redundant group in the same storage module and allocates the page. In a case in which an unallocated page is not present in the redundant group in the same storage module, the write logic 212 may allocate a page from the redundant group in the other storage module.

It is noted that the write logic 212 repeats similar processes in a case in which the write request from the computing machine 4 is sequential. In a case of not performing the deduplication process at the time of receiving the write request, the write logic 212 performs a similar process to that in a case of determining that there is no duplicated data.

FIG. 14A is an explanatory diagram of a process flow by the deduplication logic 215. A process by the deduplication logic 215 is executed in Step 507 by the write logic 212 depicted in FIG. 13A.

In Step 531, the deduplication logic 215 determines whether the same data identified from the fingerprint table 220 referred to in Step 504, refer to FIG. 13A, is stored in the redundant group 25 in the own-system storage module or in the redundant group in the other-system storage module. The deduplication logic 215 goes to Step 532 in a case in which the data is stored in the redundant group in the own-system storage module as a result of determination, and goes to Step 542 in a case in which the data is stored in the redundant group in the other-system storage module.

Details of a determination process as to whether the redundant group is in the own-system storage module or in the other-system storage module are as follows.

(1) The deduplication logic 215 identifies the data unit matching in data from the information in the fingerprint table 220 acquired in Step 504. The data unit identified here is referred to as "deduplicated data unit candidate."

It is assumed, for example, that data "B" having the same content as that of the data unit 2709 is newly written to a certain data unit in the volume 27a. A value of the fingerprint of the data "B" is "BBBB BBBB BBBB BBBB" in hexadecimal notation, and the deduplication logic 215 identifies the data unit 2709 as a duplicated data unit candidate by the search of the fingerprint table 220. In addition, the deduplication logic 215 identifies the cache space 270f in which the duplicated data unit candidate 2709 is stored.

(2) The deduplication logic 215 identifies the compressed data cache space in which the compressed data of the deduplicated data unit candidate is stored and an address thereof from the reference management table 218. It is noted that in a case in which the duplicated data unit candidate is already stored in the deduplicated data volume, the deduplication logic 215 further refers to the reference management table 218 and identifies the compressed data cache space of the compressed data of the deduplicated data unit candidate and the address of the compressed data.

For example, the deduplication logic 215 identifies the compressed data cache space of the duplicated data unit candidate 2709 identified in the previous section as the compressed data cache space 271f from the management table 218c. In addition, the deduplication logic 215 identifies the storage destination address of the compressed data in the compressed data cache space 271f as 2503.

(3) The deduplication logic 215 refers to the page management table 222 and identifies the redundant group in which the compressed data identified in (2) is stored.

For example, with reference to the page management table 222, a page at the redundant group page address 251f in the redundant group 25b is allocated to an area of one page from the cache space address 272f in the identified compressed data cache space 271f. Since the storage destination address 2503 of the compressed data identified in the previous section is contained in a range of one page from the cache space address 272f, refer to FIG. 5, the deduplication logic 215 identifies redundant group 25b by referring to the page management table 222 of FIG. 11.

(4) With reference to the configuration management table 223, the deduplication logic 215 identifies the storage module of the identified redundant group.

For example, the deduplication logic 215 identifies the redundant group 25b identified in the previous section as being configured in the storage module 2b by referring to the configuration management table 223.

(5) The deduplication logic 215 determines whether the identified storage module matches the storage module of the controller 21 that executes the present process.

In Step 532, the deduplication logic 215 determines whether the deduplicated data unit candidate is already registered in the duplicated data volume. A process flow of this determination process is as follows.

(a) With reference to the reference management tables 218, the deduplication logic 215 refers to volume in the column 2181 of the duplicated data unit candidate.

(b) With reference to the volume management table 217, the deduplication logic 215 refers to type in the column 2175 for the volume identified in (a).

(c) In a case in which the type is duplicated data, the volume identified in (a) is a duplicated data volume and the duplicated data unit candidate is the duplicated data which has already registered in the duplicated data volume.

In a case in which the duplicated data unit candidate is not stored in the duplicated data volume yet, the deduplication logic 215 goes to Step 541. In a case in which the duplicated data unit candidate is already stored, the deduplication logic 215 goes to Step 535.

In Step 541, the deduplication logic 215 stores the duplicated data in the duplicated data volume. This process will be described later.

In Step 533, the deduplication logic 215 updates the duplication management table 220 in respect to the duplicated data stored in the duplicated data volume. For example, as depicted in the duplication management table 220c of FIG. 9, in a case in which the deduplication logic 215 executes deduplication to the data units 2701 and 2703 and causes the data units 2701 and 2703 to refer to the duplicated data unit address 2708, the deduplication logic 215 records information about the data units 2701 and 2703 for the duplicated data unit 2708 in the duplication management table 220c.

In Step 534, the deduplication logic 215 updates the reference management table 218 and records a relationship between the duplicated data moved to the duplicated data volume and the duplicated data unit candidates. For example, in the row corresponding to the data unit 2702 in the reference management table 218a of FIG. 7, the deduplication logic 215 records "270e" that is the identifier of the cache space of the duplicated data in the storage destination cache space column 2185, records "2708" that is the address of the duplicated data in the storage destination address column 2186, and records "Y" in the column 2184 indicating "duplicated."

In a case in which the duplicated data unit candidate is already stored in the duplicated data volume, the deduplication logic 215 does not execute a storage process of Step 541 for storing the duplicated data in the duplicated data volume and only updates the duplication management table 220 and the reference management table 218.

In a case in which the duplicated data unit candidate is already stored in the redundant group 25 of the other-system storage module 2, the deduplication logic 215 determines whether to execute deduplication in Step 542. For example, in a case in which the data units equal to or greater than a preset threshold refer to the deduplicated data unit candidate already stored in the other-system storage module 2, in which case the number of references is equal to or greater than the threshold, then the deduplication logic 215 determines that efficiency of the deduplication is sufficiently high, and the deduplication logic 215 determines that the deduplication is not executed for giving priority to a read performance and goes to Step 535.

The deduplication logic 215 may make determination on the basis of an access frequency of the data unit corresponding to the duplicated compressed data besides this threshold. In other words, in a case of a high access frequency, the deduplication logic 215 determines that the other-system input/output highly likely takes place and stores the same data in the own-system storage module.

In this way, even if the same data unit is present in the other-system storage module, storing the same data in the own system storage module makes it possible to accelerate the read process. It is noted that an administrator of the storage system 1 can set the threshold or the access frequency used in this determination.

In this way, in a case in which access to the duplicated data corresponds to the other-system input/output, storing the compressed data in the own system storage module makes it possible to improve a throughput performance. Since the determination whether to store the compressed data in the own-system storage module is based on the access frequency of data of interest or the number of references to the duplicated data, it is possible to make data management in the light of a trade-off with a data volume reduction effect derived from the deduplication.

In a case of executing the deduplication, the deduplication logic 215 performs the deduplication process from Step 532 on the other-system deduplicated data unit candidate. At this time, the deduplication logic 215 may inquire the other-system controller 21 whether the deduplicated data unit candidate is already stored in the duplicated data volume in Step 532. Furthermore, the deduplication logic 215 may request the other-system controller 21 to store the duplicated data in the duplicated data volume in Step 541. Moreover, the deduplication logic 215 may request the other-system controller 21 to update the duplication management table 220 or the reference management table 218 in Steps 533 and 534.

In Step 542, in a case of determining not to execute the deduplication, the deduplication logic 215 stores data in the redundant group 25 in the own-system storage module 2. In this case, the deduplication logic 215 performs processes "compression and storage" in Step 535 and "fingerprint table (FPT) update" in Step 536. Since these processes are the same in content to Steps 506 and 508 depicted in FIG. 13A, description thereof is omitted.

Details of the process in Step 541 will be described with reference to a process flowchart of FIG. 14B. In Step 541, the deduplication logic 215 determines the duplicated data volume and the data unit thereof for storing the duplicated data in the duplicated data volume. It is preferable to select as, the duplicated data volume, a duplicated data volume processed by the controller 21 in the same storage module as that of the controller 21 executing the present logic. In addition, as the data unit of the duplicated data, the data unit next to the previously selected data unit is selected in ascending order of the data units in the cache space in the duplicated data volume. While a mechanism for managing allocation of the cache space is provided for this selection, description of the mechanism is omitted.

In Step 538, the deduplication logic 215 transfers the data to the cache memory corresponding to the data unit for storing the duplicated data selected in Step 537.

Since Steps 539 and 540 are the same in content to Steps 506 and 508 depicted in FIG. 13A, description thereof is omitted.

<Read Process>

FIGS. 15A to 15D are explanatory diagrams of process flows by the read logic 211. The read logic 211 is logic for processing a read request when the computing machine 4 issues the read request to read a data unit. A content of the process by the read logic 211 will be described hereinafter with reference to FIGS. 15A and 15B.

Figure 15A:
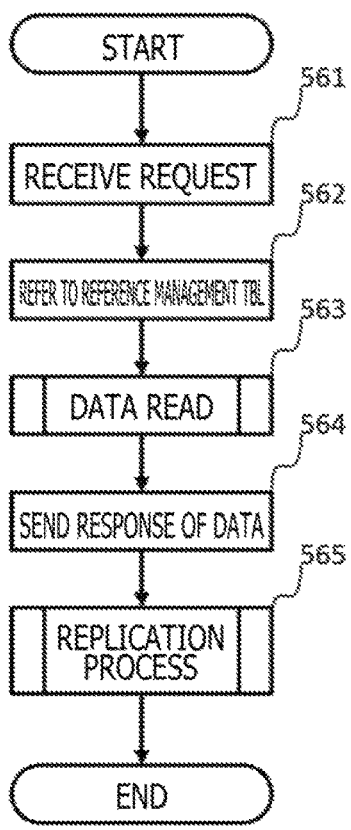
FIGS. 15A to 15D are read logic process flowcharts.

In Step 561 of FIG. 15A, the read logic 211 receives the read request from the computing machine 4. This read request contains an identifier that indicates the volume in which data to be read is stored and an LBA and a length of the data to be read. A case of the read request to one data unit will be taken herein by way of example. It is noted that the read logic 211 can process a request to read data of a size smaller than that of the data unit or a request to read data of a size equal to or larger than that of the data unit similarly to the case of the write logic 212.

In Step 562, the read logic 211 refers to the reference management table 218 in respect to the data unit to be read and acquires information about the compressed data cache space or cache space in the column 2185 and the storage destination address in the column 2186.

In Step 563, the read logic 211 reads the compressed data of the data unit requested to be read from the redundant group 25. A course of this process will be described later.

In Step 564, the read logic 211 expands the data read from the redundant group 25 and sends a response to the computing machine 4 that is a request source.

In Step 565, in a case in which the data read in Step 563 is one in the redundant group 25 in the other-system storage module 2, the read logic 211 performs a process for creating a replica of the data and storing the replica in the own-system redundant group 25. This can dispense with the other-system input/output in subsequent reading of the same data. In other words, even if the same data unit is present in the other-system storage module, storing the same data in the own-system storage module makes it possible to accelerate the read process.

Figure 15B:
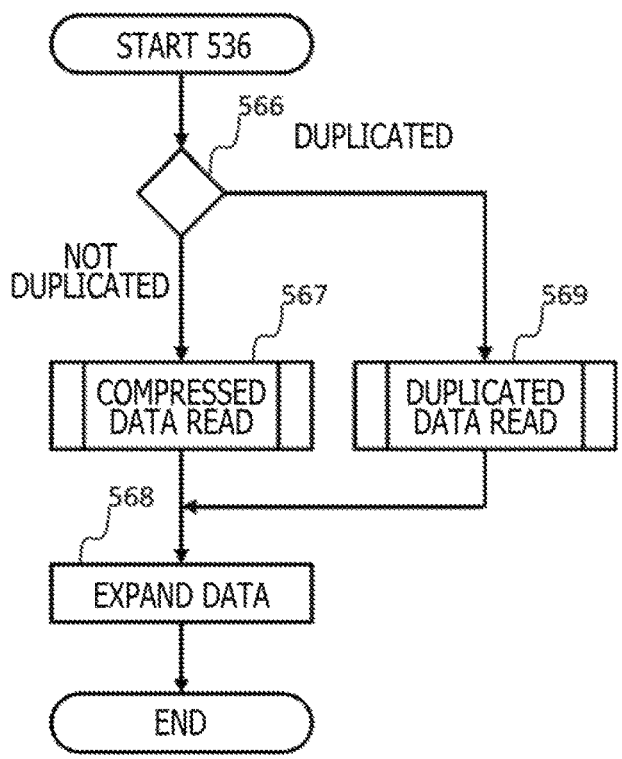

A data read process in Step 563 will be described with reference to the process flowchart of FIG. 15B. In Step 566, the read logic 211 determines whether the requested data unit is a deduplicated data unit. In this determination, the read logic 211 uses the information about the data unit acquired in Step 562. In a case of the deduplicated data unit, the read logic 211 goes to Step 569; otherwise, the read logic 211 goes to Step 567. These steps will be described later.

In Step 568, the read logic 211 expands or decompresses the compressed data acquired in Step 567 or 569. The read logic 211 sends this expanded data to the computing machine 4 in Step 564 described above as the response.

Figure 15C:
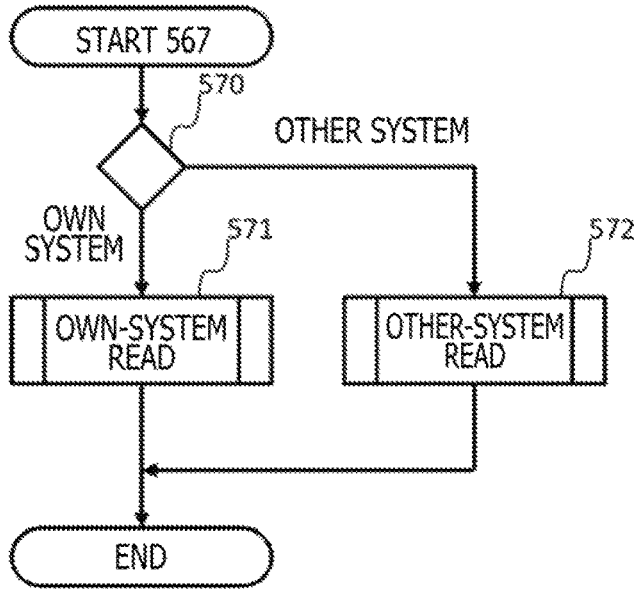

Details of a process in Step 567 will be described with reference to the process flowchart of FIG. 15C. In Step 570, the read logic 211 determines whether data of the requested data unit is stored in the redundant group in the own-system storage module. In a case in which the data is already stored in the redundant group in the own-system storage module, the read logic 211 performs a process in Step 571; otherwise, the read logic 211 performs a process in Step 572. Details of these processes will be described later.

Figure 15D:
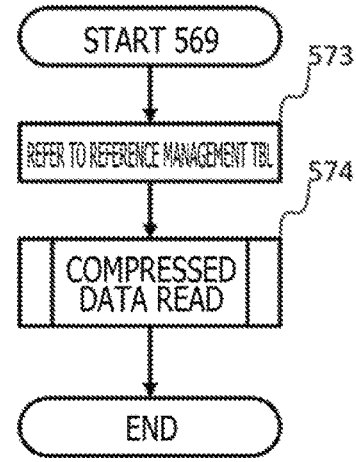

Details of a process "duplicated data read" in Step 569 will be described with reference to the process flowcharts of FIG. 15D.

In Step 573, the read logic 211 refers to the reference management table 218 in respect to the duplicated data unit in which the data of the requested data unit is stored, and obtains information about a storage destination of the compressed data of the data.

In Step 574, the read logic 211 reads the compressed data from the redundant group 25 on the basis of the information acquired in Step 573. This process is the same as the process starting from Step 570.

Figure 16A:
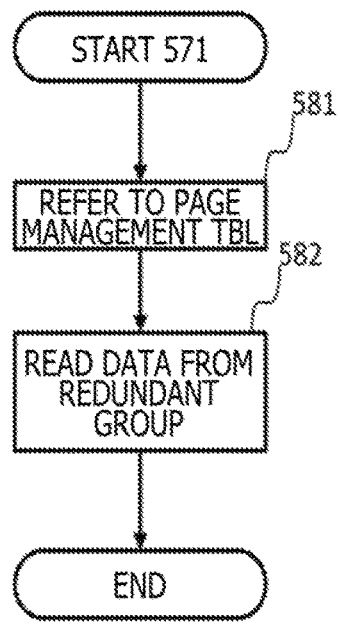
FIGS. 16A and 16B are own-system transfer logic process flowcharts and an other-system transfer logic process flowchart.
Figure 16B:
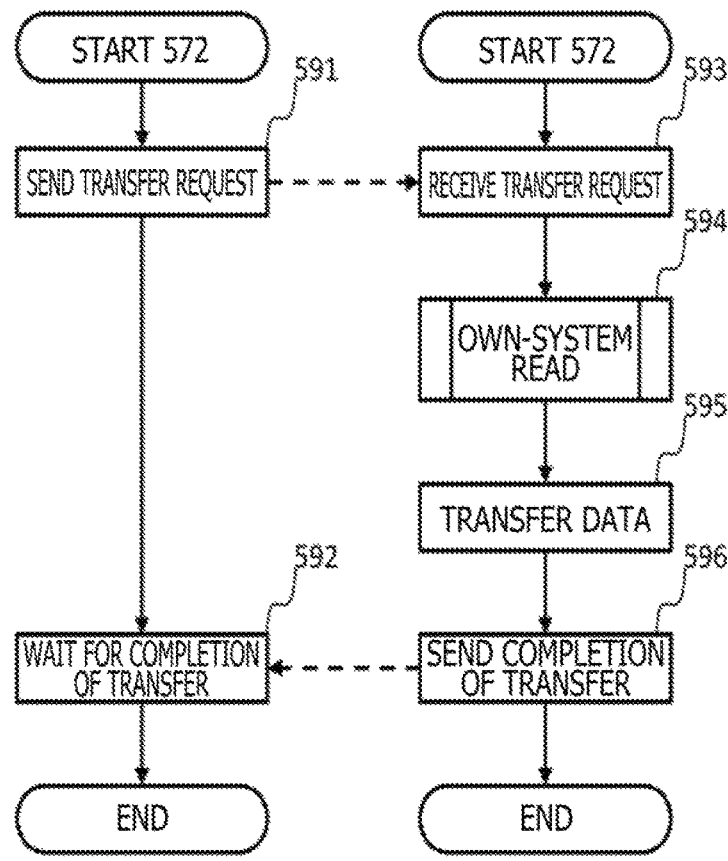

FIGS. 16A and 16B depict process flows by the own-system transfer logic 214 and the other-system transfer logic 213. The own-system transfer logic 214 depicted in FIG. 16A is logic for reading data or compressed data, in the read process, from the redundant group 25 in the same storage module 2 as that of the controller that is executing the read process.

The other-system transfer logic 213 depicted in FIG. 16B is logic for reading data, in the read process, from the redundant group 25 in the storage module 2 other than that of the controller that is executing the read process. The own-system transfer logic 214 executes a process in Step 571 by the read logic 211 depicted in FIG. 15C. The other-system transfer logic 213 executes a process in Step 572 by the read logic 211 depicted in FIG. 15C. The own-system transfer logic 214 will be described hereinafter.

The own-system transfer logic 214 starts from Step 581.

In Step 581, the own-system transfer logic 214 refers to the page management table 222 and identifies the page 251 of the redundant group 25 in which the data to be read is stored.

In Step 582, the own-system transfer logic 214 reads the data of interest from the identified page 251.

Next, the other-system transfer logic 213 will be described. In the other-system transfer logic 213, it is necessary to cooperate with the controller 21 in the other storage module 2. Motions of the own-system controller that is a controller executing the read process and those of the other-system controller that is a controller reading data from the redundant group in response to a request from the own-system controller will be described with reference to FIG. 16B. The other-system transfer logic 213 starts from Step 591. A process starting from Step 591 is performed by the own-system controller.

In Step 591, the own-system controller issues a data transfer request to the other-system controller. The own-system controller then waits for a notification of completion of transfer from the other-system controller in Step 592.

On the other hand, the other-system controller receives the transfer request from the own-system controller and starts a process in Step 593.

In Step 594, the other-system controller reads designated data from the redundant group 25. This process is equivalent to that of FIG. 16A.

In Step 595, the other-system controller transfers the data to the own-system controller that is a request source.

In Step 596, the other-system controller notifies the own-system controller that is the request source of completion of transfer.

Figure 17A:
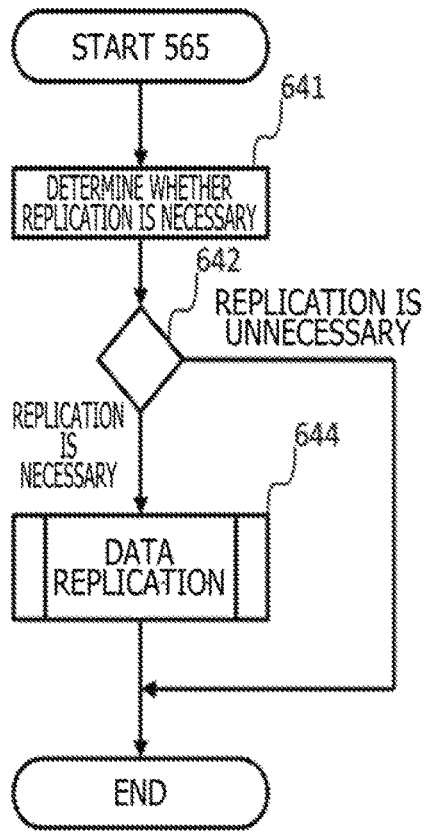
FIGS. 17A and 17B are read logic (replication process) process flowcharts.

FIG. 17A is an explanatory diagram of a process flow of a replication process that is part of the read process. The present flow is details of Step 565 of FIG. 15A. The replication process starts from Step 641.

In Step 641, the read logic 211 determines whether replication is necessary. In a case in which the data to be read is already stored in the redundant group in the other-system storage module other than that of the controller managing the volume, the read logic 211 determines that replication is necessary.

It is noted that the access frequency or the data reduction effect deriving from the duplicated data may be used as a condition on which it is determined that replication is necessary. For example, the number of occurrences of a read access is recorded for every data unit or every certain address range containing the data unit, and the read logic 211 may determine that replication of the duplicated data is necessary in a case in which the number of occurrences of the read access per unit time is equal to or higher than a certain value or in a case in which a tendency to increase the number of occurrences of the read access is observed. Alternatively, the read logic 211 may determine that replication is necessary in a case in which the duplicated data is referred to from the data units the number of which is equal to or larger than a certain number. Furthermore, replication of the data to the own-system redundant group can be carried out regardless of whether the data to be processed is already deduplicated.

In a case of determining in Step 642 that replication is necessary, the read logic 211 goes to Step 644. Otherwise, the read logic 211 ends the process.

In Step 644, the read logic 211 executes a data replication process. Details of this process will be described with reference to the process flow of FIG. 17B.

In Step 631, the read logic 211 determines whether the data unit to be processed is a deduplicated data unit. In determination, the read logic 211 uses data acquired from the reference management table 218. In a case of the deduplicated data unit, the read logic 211 goes to Step 632. Otherwise, the read logic 211 goes to Step 636.

In Step 632, the read logic 211 stores data of the data unit to be processed in the redundant group in the own-system storage module. This process is similar in content to the process starting from Step 537 of FIG. 14B.

In Step 633, the read logic 211 identifies the data units for each of which the reference management table 218 is necessary to update. The data units for each of which the reference management table 218 is necessary to update are the data units that satisfy the following conditions.

(1) The data unit referring to the duplicated data to be replicated in Step 632

(2) The data unit in the volume managed by the controller in the own-system storage module Updating the reference management table 218 and referring to the moved compressed data in respect to each of these data units make it possible to suppress the other-system input/output from taking place at a time of reading these data units.

In Step 634, the read logic 211 updates the duplication management table 220 in respect to the replicated duplicated data. Specifically, the read logic 211 records each of the data units identified in Step 633 in the duplication management table 220 as the data unit referring to the replicated duplicated data.

In Step 635, the read logic 211 updates the reference management table 218 in respect to each of the data units identified in Step 633. Specifically, the read logic 211 updates the reference management table 218 so that the data unit identified in Step 633 refers to the replicated duplicated data.

In a case of determining in Step 631 that the data unit to be processed is not the deduplicated data unit, the read logic 211 stores and compresses the data in Step 636, updates the reference management table 218 in Step 635, and ends the process. A content of a process in Step 636 is similar to that of the process starting from Step 511 depicted in FIG. 13B.

Figure 17B:
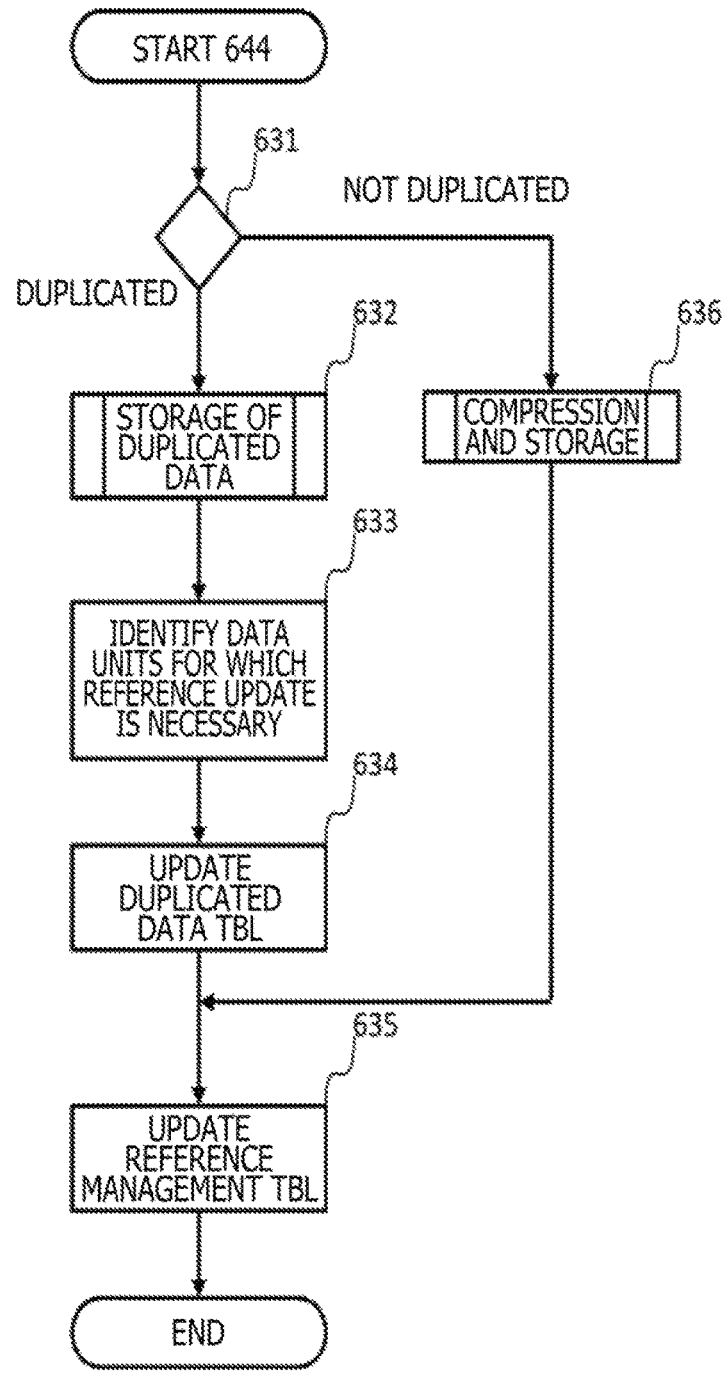

By performing the data replication process depicted in FIGS. 17A and 17B, even in a case in which the other-system input/output for referring to the data stored in the other-system storage module is necessary due to the deduplication, it is possible to accelerate the read process by storing the same data in the own-system storage module.

<Cyclic Process>

Figure 18:
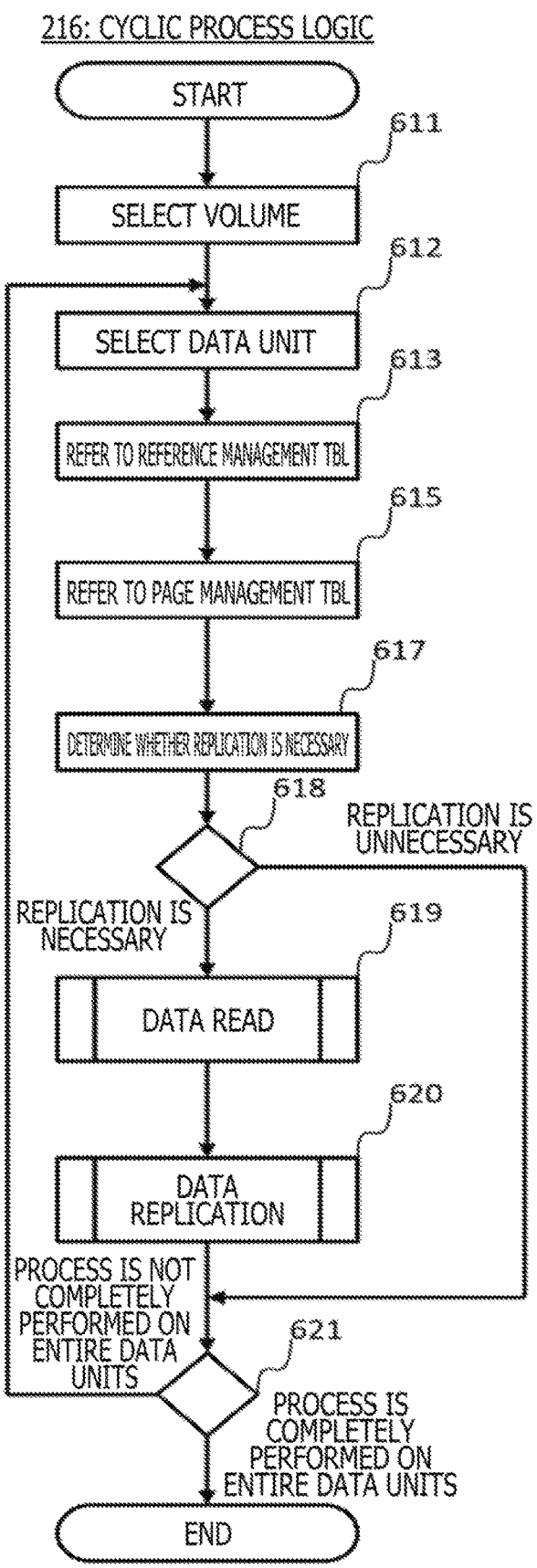
FIG. 18 is a cyclic process logic process flowchart.

FIG. 18 is an explanatory diagram of a process flow by the cyclic process logic 216. The cyclic process logic 216 replicates the compressed data so that the data unit subjected to the other-system input/output is processed by the own-system input/output in advance, independently of the process in response to an input/output request from the computing machine 4. Details of a process by the cyclic process logic 216 will be described.

In Step 611, the cyclic process logic 216 selects one volume 27 to be processed.

In Step 612, the cyclic process logic 216 selects one data unit in the volume selected in Step 611 as a data unit to be processed. The cyclic process logic 216 selects the data units in the selected volume one by one and performs a subsequent process. A data unit selection method may be such that the cyclic process logic 216 can select the lead data unit in the volume at a time of initial execution and can select a next data unit to the previously selected data unit in ascending order of addresses at a time of next execution.

In Step 613, the cyclic process logic 216 refers to the reference management table 218 in respect to the data unit selected in Step 612, and obtains information about the compressed data to which the data unit is referring. In a case in which the data unit is the deduplicated data unit, the cyclic process logic 216 obtains information about the compressed data of the duplicated data to which the data unit is referring.

In Step 615, the cyclic process logic 216 refers to the page management table 222, and identifies the redundant group 25 in which the compressed data identified in Step 613 is stored.

In Step 617, the cyclic process logic 216 determines whether data replication is necessary. This determination is the same as a content of the process in Step 565 of FIG. 15A. In a case of determining that replication is necessary in Step 618, the cyclic process logic 216 performs a process in Step 619. Even in the case in which the other-system input/output for referring to the data stored in the other-system storage module is necessary due to the deduplication, it is possible to accelerate the read process by storing the same data in the own-system storage module.

In Step 619, the cyclic process logic 216 reads data of the data unit to be processed from the redundant group 25 and stores the data in the memory 210. This process is the same as the process starting from Step 566 depicted in FIG. 15B.

In Step 620, the cyclic process logic 216 stores a replica of the data read in Step 619 in the redundant group subordinate to the same storage module as that of the volume to be processed. This process is the same in content as the process starting from Step 631 depicted in FIG. 17B.

In Step 621, the cyclic process logic 216 determines whether the process has been performed on the entire data units in the selected volume. In a case in which an unprocessed data unit is present, the cyclic process logic 216 goes to Step 612 and performs the process on the next data unit. Otherwise, the cyclic process logic 216 ends the process.

As the opportunity of executing the deduplication, an opportunity independent of the write process is conceivable in addition to the opportunity of the write process depicted in FIGS. 13A and 13B. A deduplication process executed independently of the opportunity of the write process will be referred to as "post-process deduplication process," hereinafter.

By performing the data replication process 620 depicted in FIG. 18, even in the case in which the other-system input/output for referring to the data stored in the other-system storage module is necessary due to the deduplication, it is possible to accelerate the read process by storing the same data in the own-system storage module.

<Post-Process Deduplication Process>

Figure 19:
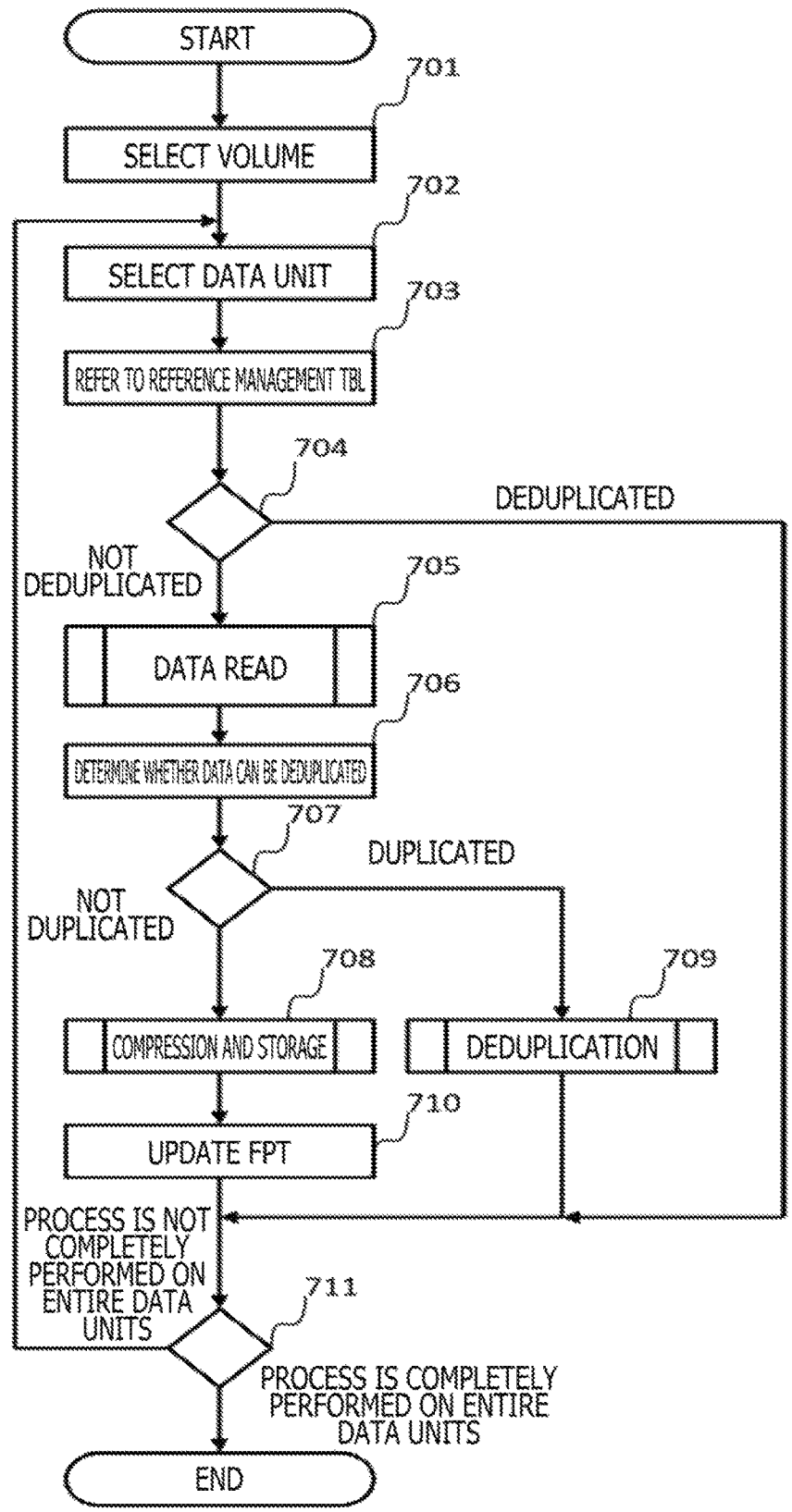
FIG. 19 is a post-process deduplication logic process flowchart.

FIG. 19 is an explanatory diagram of a process flow by post-process deduplication logic. The post-process deduplication logic is implemented as part of the deduplication logic 215. In a case in which it is premised that a post-process deduplication process is performed, the write logic 212 of FIGS. 13A and 13B may end the process after sending the response to the computing machine 4 as the host without executing the process after Step 504. The post-process deduplication logic in the deduplication logic 215 will be described with reference to FIG. 19.

In Step 701, the deduplication logic 215 selects one volume 27 to be processed.

In Step 702, the deduplication logic 215 selects one data unit in the volume selected in Step 701 as a data unit to be processed. The deduplication logic 215 selects the data units in the selected volume one by one and performs a subsequent process. A data unit selection method may be such that the deduplication logic 215 can select the lead data unit in the volume at a time of initial execution and can select a next data unit to the previously selected data unit in ascending order of addresses at a time of next execution.

In Step 703, the deduplication logic 215 refers to the reference management table 218 in respect to the data unit selected in Step 702, and obtains information about the compressed data to which the data unit is referring.

In Step 704, the deduplication logic 215 determines whether the data unit selected in Step 702 is a deduplicated data unit. In a case of the deduplicated data unit, the deduplication logic 215 goes to Step 711; otherwise, the deduplication logic 215 goes to Step 705.

In Step 705, the deduplication logic 215 reads data of the data unit to be processed from the redundant group 25 and stores the data in the memory 210. This process is the same as the process starting from Step 566 depicted in FIG. 15B.

A process in Steps 706 to 710 is a process for deduplicating the selected data unit. This process is equivalent to Steps 504 to 508 depicted in FIG. 13A.

In Step 711, the deduplication logic 215 determines whether the process has been performed on the entire data units in the selected volume. In a case in which an unprocessed data unit is present, the deduplication logic 215 goes to Step 702 and performs the process on the next data unit. Otherwise, the deduplication logic 215 ends the process. If the data replication process is performed in Step 565 depicted in FIG. 15A before Step 711, it is possible to read data at high speed by the own-system input/output without performing the other-system input/output during execution of the post-process deduplication logic.

A data placement method adopted such that the other-system input/output can be suppressed has been described so far. According to one aspect, in a case in which the same duplicated data is stored in a plurality of storage modules, the data unit may be intentionally processed by the other-system input/output depending on conditions. For example, as for the deduplicated data unit having a low access frequency, the duplicated data in the other-system storage module is referred to on purpose and the duplicated data in the own system is deleted, thereby making it possible to reduce consumption of the redundant groups.

While one storage system is configured by combining a plurality of storage modules by the controller-to-controller network in the present embodiment, the present invention is also applicable to a computing machine system in which a plurality of storages are connected to each other using the other network connection technique such as a local area network (LAN) or the Internet.

While data is compressed and then stored at a time of recording the data in the storage medium in the present embodiment, data may be recorded therein without compressing the data in another embodiment.

What is claimed is:

1. A large-scale storage system comprising:
   a first storage module and a second storage module each connected to a computing machine, the first storage module and the second storage module being connected to each other by a network, wherein
   the first storage module includes a first storage medium, and a first controller that configures a first volume from the first storage medium and that exercises control over a write process in such a manner that data is written to the first storage medium from the computing machine via the first volume and over a read process in such a manner that data stored in the first storage medium is read to the computing machine via the first volume,
   the second storage module includes: a second storage medium, and a second controller that configures a second volume from the second storage medium and that exercises control over a write process in such a manner that data is written to the second storage medium from the computing machine via the second volume and over a read process in such a manner that data stored in the second storage medium is read to the computing machine via the second volume, and
   the first controller:
      determines whether second data, that is same as first data requested to be written to the first storage medium, is already stored in the second storage module when the first storage module receives a write request to the first volume from the computing machine,
      determines whether to store the first data in the first storage medium or to refer to the second data in the second storage module in a case in which the second data is already stored in the second storage module, and
      in determining whether to store the first data in the first storage medium or to refer to the second data in the second storage module in the case in which the second data is already stored in the second storage module, stores the first data in the first storage medium in a case in which a number of references to the second data exceeds a threshold.

2. The large-scale storage system according to claim 1, wherein
   the first controller compresses the first data and stores the compressed first data in the first storage medium.

3. The large-scale storage system according the claim 1, wherein
   the first controller determines whether to replicate data which is stored in the second storage module and which is being referred to, in the first storage medium of the first storage module in a case in which a read request from the computing machine to the first volume is to refer to the data which is stored in the second storage module.

4. The large-scale storage system according to claim 3, wherein
   the first controller cyclically determines whether to replicate the data which is being referred to.

5. The large-scale storage system according to claim 3, wherein in a case of determining to replicate the data which is being referred to as a result of determination as to whether to replicate the data which is being referred to, the first controller compresses the data to be replicated and records the compressed data in the first storage medium.

6. The large-scale storage system according to claim 3, wherein the first controller determines whether to replicate the data which is being referred to on a basis of process frequency information about data requested to be read or on a basis of the number of references to the data requested to be read.

* * * * *